United States Patent
Krishna et al.

(10) Patent No.: US 11,567,574 B2
(45) Date of Patent: Jan. 31, 2023

(54) GUIDED INTERACTION WITH A QUERY ASSISTANT SOFTWARE USING BRAINWAVE DATA

(71) Applicant: Optum Technology, Inc., Eden Prairie, MN (US)

(72) Inventors: Amit Krishna, Bangalore (IN); Rahul Dutta, Bangalore (IN); Love Hasija, Sonepat (IN); Atul Kumar, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 19 days.

(21) Appl. No.: 17/028,179

(22) Filed: Sep. 22, 2020

(65) Prior Publication Data
US 2022/0091669 A1    Mar. 24, 2022

(51) Int. Cl.
*G06F 3/01* (2006.01)
*G06F 16/9032* (2019.01)
*G06N 20/00* (2019.01)

(52) U.S. Cl.
CPC .......... *G06F 3/015* (2013.01); *G06F 16/9032* (2019.01); *G06N 20/00* (2019.01)

(58) Field of Classification Search
CPC ...... G06F 3/015; G06F 40/30; G06F 16/3329; G06F 16/242; G06F 16/3338; G06F 16/9032; G06N 20/00
See application file for complete search history.

(56) References Cited

U.S. PATENT DOCUMENTS

| | | |
|---|---|---|
| 6,546,378 B1 | 4/2003 | Cook |
| 9,955,902 B2 | 5/2018 | Frank et al. |
| 10,437,332 B1 | 10/2019 | Paterson et al. |

(Continued)

FOREIGN PATENT DOCUMENTS

WO    2019/040665 A1    2/2019

OTHER PUBLICATIONS

"Neuroscience Innovation Report," Deloitte, (2018), (23 pages). [Retrieved from the Internet Dec. 15, 2020] <URL: https://www2.deloitte.com/content/dam/Deloitte/de/Documents/Innovation/Neuroscience-Innovation-Report-2018-Deloitte.pdf>.
Bascil, M. Serdar. "A New Approach on HCI Extracting Conscious Jaw Movements Based on EEG Signals Using Machine Learnings," Journal of Medical Systems, vol. 42, No. 169, pp. 1-11, (2018). DOI: 10.1007/s10916-018-1027-1.

(Continued)

*Primary Examiner* — Wilson W Tsui
(74) *Attorney, Agent, or Firm* — Alston & Bird LLP

(57) ABSTRACT

Systems and methods are configured to enable guided interaction with query assistant software using brainwave data. In various embodiments, a client device presents a query assistant user interface to a monitored end-user that describes a query associated with a plurality of response options and an intended physiological action for each response option. Accordingly, one or more user monitoring data objects associated with the monitored end-user are received that include user brainwave monitoring data objects. These user monitoring data objects are processed using one or more response designation machine learning models to generate response designators based on the user monitoring data objects that includes a physiological response designator describing a selected intended physiological action that is deemed to be related to the user monitoring data objects. Accordingly, a user response is then (Continued)

determined based on the response designators and the user interface may be updated based on the user response.

17 Claims, 15 Drawing Sheets

(56)     References Cited

U.S. PATENT DOCUMENTS

| | | | |
|---|---|---|---|
| 10,521,666 | B2 | 12/2019 | Rothblatt |
| 10,990,175 | B2* | 4/2021 | Forsland ................. G06F 3/011 |
| 11,023,046 | B2* | 6/2021 | Ketz ..................... G06N 3/0454 |
| 2014/0347265 | A1* | 11/2014 | Aimone ................ H04W 4/029 |
| | | | 345/156 |
| 2015/0045007 | A1 | 2/2015 | Cash |
| 2017/0042439 | A1 | 2/2017 | Yeow et al. |
| 2017/0115742 | A1 | 4/2017 | Xing et al. |
| 2017/0337834 | A1* | 11/2017 | Shindi ...................... G09B 5/02 |
| 2018/0068031 | A1* | 3/2018 | Hewavitharana ........................... |
| | | | G06F 16/90328 |
| 2018/0174055 | A1* | 6/2018 | Tirumale ............... G06Q 10/10 |
| 2018/0199840 | A1* | 7/2018 | Loureiro ................. G06F 3/015 |
| 2019/0073029 | A1* | 3/2019 | Filatov ................. G06F 3/0484 |
| 2019/0130244 | A1* | 5/2019 | Mars ....................... G10L 15/18 |
| 2019/0142349 | A1 | 5/2019 | Schorey et al. |
| 2019/0258944 | A1 | 8/2019 | Lee et al. |
| 2019/0286698 | A1* | 9/2019 | Gupta ..................... G06F 40/35 |
| 2020/0097076 | A1 | 3/2020 | Alcaide et al. |
| 2020/0298100 | A1* | 9/2020 | Ambinder .............. A61B 3/112 |

OTHER PUBLICATIONS

Güler, İnan et al. "Multiclass Support Vector Machines for EEG-Signals Classification," IEEE Transactions on Information Technology in Biomedicine, vol. 11, No. 2, Mar. 2007, pp. 117-126.

Lopez-Gil, Juan-Miguel et al. "Method for Improving EEG Based Emotion Recognition by Combining it with Synchronized Biometric and Eye Tracking Technologies in a Non-invasive and Low Cost Way," Frontiers in Computational Neuroscience, vol. 10, No. 95, Aug. 19, 2016, pp. 1-14. DOI: 10.3389/fncom.2016.00085.

Lu, Yifei et al. "Combining Eye Movements and EEG to Enhance Emotion Recognition," Proceedings of the Twenty-Fourth International Joint Conference on Artificial Intelligence (IJCAI 2015), vol. 15, Jul. 25, 2015, pp. 1170-1176.

Murugappan, M. et al. "Inferring of Human Emotional States Using Multichannel EEG," European Journal of Scientific Research, vol. 48, No. 2, (2010), pp. 281-299. ISSN: 1450-216X.

Ren, Fuji et al. "A Review on Human-Computer Interaction and Intelligent Robots," International Journal of Information Technology & Decision Making, vol. 19, No. 1, (2020), pp. 5-47. DOI: 10.1142/S0219622019300052.

* cited by examiner

GUIDED INTERACTION WITH A QUERY ASSISTANT SOFTWARE USING BRAINWAVE DATA

TECHNOLOGICAL FIELD

Embodiments of the present invention generally relate to improving query assistant software applications. Various embodiments of the present invention provide innovative techniques for improving query assistant software applications.

BACKGROUND

Existing user interfaces to many devices, equipment, and services pose great obstacles for individual who have physical challenges, especially those with severe physical challenges. For instance, individuals who suffer from some form of paralysis can be severely limited with respect to physiology. Because these individuals may have very limited abilities to move different body parts, these individuals oftentimes have trouble interacting with many interfaces to various devices, equipment, and services. For example, a device such as a smart phone or tablet typically has a touchscreen that is used to interact with the device. However, an individual who has paralysis in his or her hands may not be able to use the touchscreen. Therefore, such a device may be virtually inaccessible to this individual. Statistics show that 5.6 million Americans, roughly one in fifty, are paralyzed to some degree. Therefore, the inability to interact with many devices, equipment, and services is a problem that exists for many individuals.

Technologies have been developed to try and assist individuals who may have some form of limited physical abilities with interacting with various devices, equipment, and services. For example, technologies have been developed that work on voice commands that can be used in controlling and interacting with devices. However, many individuals who have paralysis cannot speak. In addition, technologies have been developed to sense different types of motions, such as moving a finger or eye movement, that can be used to control and interact with devices, equipment, and services. However, again, many individuals with paralysis have very little capability to move various muscles and thus various parts of the body. As a result, these individuals may have very few movements that are available for use in controlling and interacting with devices, equipment, and services. In addition, the movements they can make may be difficult to detect and that can hinder them in using motion technologies.

Therefore, a need exists in the industry for improved systems and methods for developing user interfaces for various devices, equipment, and services that can be utilized by, individuals who have severe physical challenges. It is with respect to these considerations and others that the disclosure herein is presented.

BRIEF SUMMARY

In general, embodiments of the present invention provide methods, apparatus, systems, computing devices, computing entities, and/or the like for enabling guided interaction with query assistant software using brainwave data. In various embodiments, a client device presents a query assistant user interface to a monitored end-user that describes a query associated with a plurality of response options and an intended physiological action for each response option. For example, the intended physiological action may be an intended jaw movement action or an intended eye blinking action.

Accordingly, one or more user monitoring data objects associated with the monitored end-user are received that include one or more user brainwave monitoring data objects. In addition, the user monitoring data objects may further include a user device monitoring data object, a visual monitoring data object, an audio monitoring data object, and/or a user personification data object. These user monitoring data objects are processed using one or more response designation machine learning models in order to generate a plurality of response designators based on the one or more user monitoring data objects that includes a physiological response designator describing a selected intended physiological action that is deemed to be related to the one or more user monitoring data objects. In addition, the plurality of response designators may further include an emotional intensity designator, an emotional sensitivity designator, a physiological response intensity designator, and/or a user personification designator.

In particular embodiments, the response designation machine learning models may include a sentiment detection machine learning model. Here, the sentiment detection machine learning model may be a supervised machine learning model trained using ground-truth sentiment designation labels generated based on sentiment reporting data for the monitored end-user over a sentiment monitoring window. Likewise, the response designation machine learning models may include an intensity detection machine learning model. Here, the intensity detection machine learning model may be a supervised machine learning model trained using ground-truth intensity designation labels generated based on intensity reporting data for the monitored end-user over an intensity monitoring window.

A user response is then determined based on the plurality of response designators. For instance, in particular embodiments, the user response is determined by identifying one or more dependent nodes of a current node of a conversation decision tree data object in which each dependent node is associated with a related set of candidate response designator values. Accordingly, a selected dependent node is determined to identify the user response whose related set of candidate response designator values has a highest degree of overlap relative to the plurality of response designators.

In various embodiments, the query assistant user interface may be updated on the client device based on the user response. For instance, in some embodiments, it is determined whether the selected dependent node is associated with an updated query having a plurality of updated response options. If so, then the query assistant user interface is updated to describe the updated query. Other operations may be carried out in various embodiments based on the user response.

In accordance with one aspect of the present disclosure, a method for enabling guided interaction with a query assistant software using brainwave data is provided. In various embodiments, the method comprises: causing a client device to present a query assistant user interface to a monitored end-user, wherein the query assistant user interface describes: (i) a query associated with a plurality of response options, and (ii) for each response option of the plurality of response options, an intended physiological action of a plurality of intended physiological actions; subsequent to causing the client device to present the query assistant user interface, receiving one or more user monitoring data objects associated with the monitored end-user, wherein the one or more user monitoring data objects comprise one or more user brainwave monitoring data objects; processing the one or more user monitoring data objects using one or more response designation machine learning models in order to generate a plurality of response designators based on the one or more user monitoring data objects, wherein: (i) the plurality of response designators comprise a physiological response designator, and (ii) the physiological response designator describes a selected intended physiological action of the plurality of intended physiological actions that is deemed to be related to the one or more user monitoring data objects; determining a user response based on the plurality of response designators; and causing the client device to update the query assistant user interface based on the user response.

In accordance with another aspect of the present disclosure, an apparatus is provided. In various embodiments, the apparatus comprises at least one processor and at least one memory comprising computer program code. The at least memory and the program code are configured to, with the at least one processor, cause the apparatus to: cause a client device to present a query assistant user interface to a monitored end-user, wherein the query assistant user interface describes: (i) a query associated with a plurality of response options, and (ii) for each response option of the plurality of response options, an intended physiological action of a plurality of intended physiological actions; subsequent to causing the client device to present the query assistant user interface, receive one or more user monitoring data objects associated with the monitored end-user, wherein the one or more user monitoring data objects comprise one or more user brainwave monitoring data objects; process the one or more user monitoring data objects using one or more response designation machine learning models in order to generate a plurality of response designators based on the one or more user monitoring data objects, wherein: (i) the plurality of response designators comprise a physiological response designator, and (ii) the physiological response designator describes a selected intended physiological action of the plurality of intended physiological actions that is deemed to be related to the one or more user monitoring data objects; determine a user response based on the plurality of response designators; and cause the client device to update the query assistant user interface based on the user response.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: cause a client device to present a query assistant user interface to a monitored end-user, wherein the query assistant user interface describes: (i) a query associated with a plurality of response options, and (ii) for each response option of the plurality of response options, an intended physiological action of a plurality of intended physiological actions; subsequent to causing the client device to present the query assistant user interface, receive one or more user monitoring data objects associated with the monitored end-user, wherein the one or more user monitoring data objects comprise one or more user brainwave monitoring data objects; process the one or more user monitoring data objects using one or more response designation machine learning models in order to generate a plurality of response designators based on the one or more user monitoring data objects, wherein: (i) the plurality of response designators comprise a physiological response designator, and (ii) the physiological response designator describes a selected intended physiological action of the plurality of intended physiological actions that is deemed to be related to the one or more user monitoring data objects; determine a user response based on the plurality of response designators; and cause the client device to update the query assistant user interface based on the user response.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
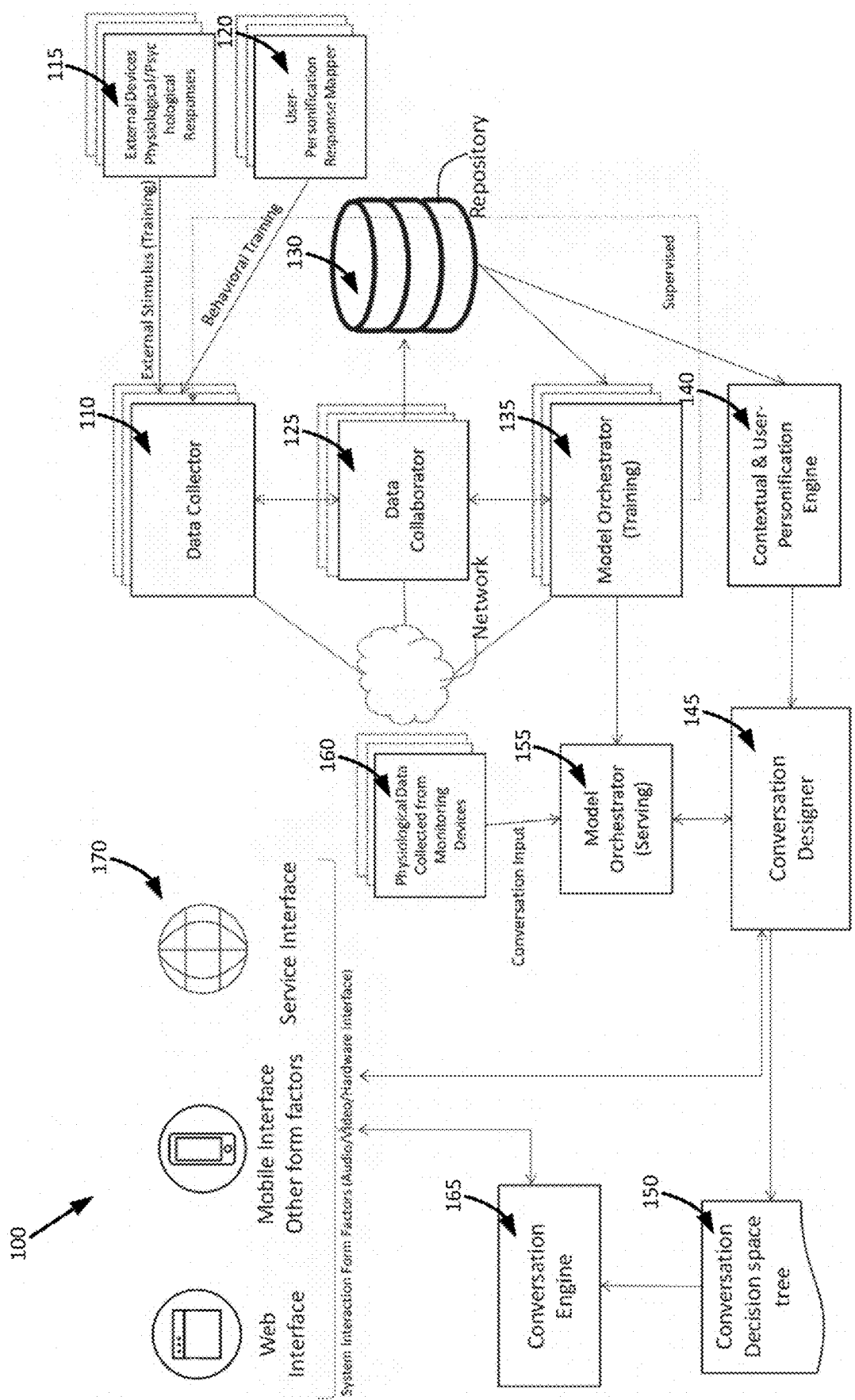
FIG. 1 is a diagram of a system architecture in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "monitored end-user" may refer to a data object that describes an end-user whose interactions, physical actions, physical conditions, and/or psychological conditions are monitored using one or more monitoring devices to help facilitate an interaction of the end-user with a computerized interface. For example, the monitored end-user may be an individual who is partially paralyzed and has limited body movement. Here, the end-user's brainwaves, eye movements, and jaw movements may be monitored using various devices to help facilitate an interaction with the end-user by interpreting responses from the end-user through detection of brainwaves, eye movements, and jaw movements.

The term "query assistant user interface" may refer to a data object that describes a computerized interface provided to a monitored end-user that is configured to display correlations between patterns of physical actions and response options. Examples of query assistant user interfaces include conventional chatbots provided on websites or an interface used to operate a smart device found in the home such as a smart thermostat or security system. As described further herein, the query assistant user interface is configured in various embodiments by using novel concepts that enable the monitored end-user who has physical limitations to interact with the interface.

The term "query" may refer to a data object that describes an inquiry presented to a monitored end-user using the query assistant user interface. For example, a query may present one or more questions to the monitored end-user to solicit responses to the questions from the end-user. While in another example, a query may present a set of operations for a device to solicit commands to operate the device.

The term "response options" may refer to a data object that describes one or more choices that may be selected by the monitored end-user in response to a query. For example, the query may pose a question with the response options of answering "yes" or "no" to the question. While in another example, the query may be operations to control an autonomous connected wheelchair and the response options may include commands to operate the wheelchair.

The term "intended physiological action" may refer to a data object that describes one or more defined bodily functions that a monitored end-user may seek to perform in order to identify a specific response option. For example, the monitored end-user may be provided with a "yes" or "no" question and the intended physiological action to select the response "yes" is for the end-user to blink her eyes once.

The term "user monitoring data object" may refer to a data object that describes a particular physiological condition, where existence of the particular physiological condition has been monitored in relation to the monitored end-user. For example, a user monitoring data object may describe monitored and collected brainwaves, eye movements, blood pressure, voice vibrations, etc. Thus, in various embodiments, the user monitoring data objects may include one or more of: "user device monitoring data objects" gathered from monitoring devices such as an electroencephalography (EEG) sensor, throat sensor, motion sensor, a blood pressure cuff, etc. Other examples of user monitoring data objects include "visual monitoring data objects" gathered from visional equipment such as a video camera; "audio monitoring data objects" gathered from audio recording equipment; and/or "user personification data objects" gathered from observations of the end-user's individual characteristics over time.

The term "response designation machine learning model" may refer to a data object that describes parameters and/or hyper-parameters of a machine learning model that is used to predict a specific physiological or psychological condition for the monitored end-user based on one or more user monitoring data objects. Here, the monitoring data objects may serve as inputs to the model. For example, a response designation machine learning model may be configured in some embodiments to predict whether the monitored end-user perform a physiological action such as moving a finger or blinking an eye based on information gathered from one or more motion detectors or a video camera. In particular embodiments, a response designation machine learning model may be configured to predict psychological reactions that a monitored end-user is experiencing such as emotional sensitivity (e.g., sentiment) based on one or more user monitoring data objects or an intensity with respect to a physiological or psychological condition.

The term "response designator" may refer to a prediction provided by a response designation machine learning model that describes whether a specific physiological or psychological condition associated with the response designation machine learning model has occurred for the monitored end-user. For example, a response designator may provide a prediction as to whether the end-user blinked an eye produced by a corresponding response designation machine learning model based on movement information gathered from a video camera used to monitor the end-user and brainwave information gathered from an EEG sensor. In particular embodiments, one or more response designators may be used that include one or more of an emotional intensity designator, an emotional sensitivity designator, physiological response designator, a physiological response intensity designator, and a user personification designator.

The term "end-user response" may refer to a data object that describes a monitored end-user's intended response to a query. Here, in particular embodiments, the end-user response to a query may be a combination of different response designators. For example, the end-user response to a particular question may be based on a first response designator providing a prediction as to whether the end-user blinked an eye and a second response designator providing a prediction on whether the end-user is experiencing positive sentiment. Here, in this example, the end-user response to the question may be a "happy" yes determined from predictions the end-user has blinked her eye and is experiencing positive sentiment.

The term "conversation decision tree data object" may refer to a data object representing: (i) a mapping of candidate responses for one or more queries to corresponding combinations of response designators, and (ii) hierarchical relationships between various queries in accordance with a decision tree structure. Here, in various embodiments, a query is designated as a node in the conversation decision tree data object and the candidate responses (e.g., response options) for the query are designated as dependent nodes. Each candidate response is associated with a related set of candidate response designator values and an end-user response to a query can be determined based on the selection of a dependent node (candidate response) in the tree whose related set of candidate response designator values has a highest degree of overlap relative to the plurality of response designators identified for the query. In addition, a candidate response may have one or more dependent nodes that serve as additional queries. Thus, in various embodiments, the conversation decision tree data object serves as a hierarchical mapping of queries and responses and their dependencies to one another.

Exemplary Technical Contributions

As noted, a technical problem encountered by many individuals who have limited physical capabilities is interacting with conventional interfaces for various systems, devices, and equipment. This is because many of these interfaces require an individual (e.g., end-user) to perform actions that the individual is incapable of performing. For example, a paralyzed individual may not be able to type on a keyboard or move a finger around a touchscreen.

Technologies have been developed to try and assist individuals who may have some form of limited physical abilities with interacting with various devices. However, for the most part, these technologies have proven to be inadequate. For example, technologies have been developed that work on voice commands and to sense different types of motions, such as moving a finger or eye movement, that can be used to control and interact with devices. However, many individuals with severe physical limitations are unable to speak and/or have very little capability to move various muscles and thus various parts of the body. These individuals may have very few movements that are available for use in controlling and interacting with devices, equipment, and services. In addition, the movements they can make may be difficult to detect that can hinder them in using motion technologies.

Embodiments of the present invention provide concepts for developing user interfaces for various devices, equipment, and services that can be utilized by individuals who have severe physical challenges. In various embodiments, machine learning models are developed to detect physiological and psychological conditions (actions and reactions) being performed and experienced by an individual who is physically challenged and interacting with an interface. Here, physiological data is collected on the individual using different types of monitoring devices while the individual is interacting with the interface. For instance, the data may include motion data collected by motion sensors, brainwave data collected by EEG sensor, video data collected by a camera, audio data collected by a recording device, etc.

The collected data is then provided as input to the models to detect physiological actions being performed by the individual as well as psychological reactions being experienced by the individual who is attempting to respond to a query being presented through the interface. Brainwave data is used in various embodiments, along with emotional sensitivity (e.g., sentiment) and/or intensity, to enhance the detection of physiological actions being performed by the individual because such actions are normally harder to detect because of the individual's limited physical capabilities. Therefore, embodiments of the invention provide solutions for the development of interfaces with improved performance and ease of use over conventional interfaces with respect to individual who have severe physical challenges.

An additional technological problem relates to the computational complexity of processing data from a variety of existing sensory devices to infer user intentions and conditions. As the number of available sensors in a distributed multi-sensor monitoring environment goes up, the task of inferring reliable and accurate determinations about end-user intentions and conditions becomes more inefficient and unreliable. Various existing monitoring solutions face substantial efficiency and reliability challenges when it comes to effectively inferring user intentions and conditions based on multi-sensory data. Various embodiments of the present invention address the technical challenges associated with efficiently and effectively performing intention/condition inference in distributed multi-sensor monitoring environments by introducing techniques for encoding a linear logic for defining relationships between various combinations of sensory inferences, e.g., by introducing techniques that rely on using conversation decision tree data objects. In doing so, various embodiments of the present invention make major technical contributions to improving the efficiency and reliability of existing distributed multi-sensor monitoring environments.

Overview of Various Embodiments

An overview is now provided to demonstrate various embodiments of the invention for developing user interfaces for various devices, equipment, and services that can be utilized by individuals who have severe physical challenges. As noted, individuals who have severe physical challenges are often limited with respect to the physical movements they can perform and as a result, have difficulty interacting with many conventional interfaces to devices, equipment, and services. This can be true even with respect to speaking.

However, although these individuals may not be able to physically perform movements, they can still often produce brain function that is required to perform movement. Thus, various embodiments of the invention utilize brain function to help in interpreting an individual's desired response to a query. EEG is a process for monitoring activity in the brain. Although an EEG graph cannot necessarily be used to "read" the brain. For instance, one cannot tell what an individual is seeing or hearing by simply performing EEG monitoring of the individual. EEG monitoring can be used in combination with other forms of monitoring to discover different responses by an individual such as, for example, sensing hand movement. A common analogy is standing outside a sports stadium, an observer may not be able to hear specific conversations between people who are inside the stadium, but the observer can often discern an empty stadium from a full stadium. In addition, the observer is often able to detect when a goal is scored as a result of suddenly hearing loud applause and cheering coming from the audience attending a sporting event at the stadium. Thus, various embodiments of the invention involve using brainwave monitoring in conjunction with other forms of monitoring to ascertain how an individual who has physical limitations is responding to an interface to a device, equipment, and/or service.

Accordingly, FIG. 1 provides a system architecture 100 that may be used in accordance of various embodiments. The initial step involves collecting monitoring data from several different individuals under controlled conditions. Here, a data collector 110 collects external stimulus gathered using several different types of monitoring devices configured to monitor physiological conditions being displayed by the monitored end-users. For instance, in particular embodiments, an individual end-user may be monitored by several different types of instruments to gather physiological data based on various scenarios carried out by the end-user as instructed by an observer. For example, the end-user may be hooked up to an EEG sensor, motion sensors for various body parts, blood pressure cuff, heart rate monitor, throat sensor, sweat patch, etc. In addition, the end-user may be monitored by observation equipment such as video, image, and/or audio equipment. Those of ordinary skill in the art can envision other devices and equipment that may be used in embodiments to monitor the end-user in light of this disclosure.

Accordingly, the end-user is run through various scenarios while being monitored and the data collector 110 collects the monitored data from the different devices and equipment 115. For example, the end-user may be monitored using an EEG sensor as well a headband configured to capture jaw movement. The end-user may then be asked to move his or her jaw. Brainwave data and movement data may then be collected from the EEG sensor and headband, respectfully, by the data collector 110 as the end-user moves his or her jaw. For instance, the data collector 110 may be hosted on a computing device that communicates with the EEG sensor and headband over some type of network such as Bluetooth and gathers the data accordingly. The end-user may then be run through additional scenarios such as eye blinking, moving a finger or toe, and/or other body movement parts. In addition, the end-user may be asked to generate audio that is recorded. Further, video may be captured during the different scenarios.

Embodiments of the invention also involve capturing emotional sensitivity (e.g., sentiment) and/or emotional intensity during these scenarios that can be associated with monitored data. Here, the end-user may be presented with different types of scenarios to attempt to trigger various emotions. For example, the patient may like strawberry ice cream and may hate burgers. Therefore, scenarios of these "likes" and "dislikes" may be presented to the end-user to stimulate brainwaves for different emotional sensitivities, e.g., the end-user's brainwaves spike when he or she is offered strawberry ice cream. Thus, brainwaves can be captured using different scenarios to establish brainwave patterns representing different positive and negative emotional sensitivities.

In addition, some embodiments involve measuring an additional aspect related to wavelength of the brainwaves. Accordingly, maximum wavelength indicating a strong reaction and minimum wavelength indicating a weak reaction can be established as brainwave data is collected. This recorded wavelength can then be used to indicate emotional intensity. The same can be collected with respect to physiological responses. For example, the end-user may be asked in a scenario to move a certain body part with high intensity and/or low intensity and the associated sensor data and brainwave wavelength data may be collected accordingly.

Finally, the observer who is guiding the end-user through the different scenarios may observe and record personification data for the end-user. For example, the observer may notice that the particular end-user is prone to blinking often. Here, in particular embodiments, the observer may use a user-personification response mapper 120 to record such observations. Such information may be useful in fine-tuning what responses are observed for the particular end-user when presented with a query as well as developing and/or selecting models that can detect when an individual is exhibiting a certain personification.

Accordingly, in various embodiments, data collection is performed for a number of different types of end-users with different capabilities. Data collection in many instances is ideally aimed for different types of end-users and/or different kinds of scenarios or situations with the same end-user. This can allow for considered amounts of ground truth data to be collected for various physiological and psychological conditions for a variety of end-users and as discussed further herein, allows for machine learning models to be developed for predicting these physiological and psychological conditions that can then be used in building interfaces for different types of devices, equipment, and services that facilitate interactions with different types of end-users with varying physical capabilities.

The data is labeled accordingly as it is collected in various embodiments. For instance, brainwave data collected during a scenario in which the end-user is asked to blink his or her eyes is labeled as such. Therefore, the system 100 may include a data collaborator 125 that is configured to combine all the collected data into individual datasets for the different types of actions/reactions invoked through the scenarios and store the datasets in a repository 130. For example, the data collaborator 125 may gather all the data collected while various end-users were moving their jaws, this may include physical data gathered by sensors as well as brainwave data collected during these times. These individual datasets can then be used to the train machine learning models for predicting the different physiological and psychological conditions (the different actions and reactions) an end-user may exhibit.

Accordingly, a model orchestrator 135 is used in various embodiments to train the machine learning models using the individual datasets for the different actions and reactions. For example, the model orchestrator 135 may train a first model to predict eye blinking, a second model to predict jaw movement, a third model to predict finger movement, etc. In addition, the model orchestrator 135 may train one or more models to predict emotional sensitivities, as well as intensity with respect to physiological and/or psychological conditions. As discussed further herein, these models are then used in real-time to detect/identify (e.g., predict) actions being carried out by an end-user and/or reactions in response to queries presented to the end-user through some type of interface. For example, the models may be used to detect whether an end-user has moved his or her jaw to select a first command or blinked an eye to select a second command displayed on an interface as response options to control a device. As noted, these models may be configured to use different types of physiological data that involves movement and brainwave data that can help to enhance the detection of the actions and/or reactions.

These machine learning models may be of different types depending on the embodiment. For instance, two-layer bidirectional Long Short-Term Memory (LSTM) models may be used in some embodiments. A bidirectional LSTM is an extension of a recurrent neural network architecture that can provide improved model performance on sequence classification problems. Here, many of the datasets for the different responses involve sequence data collected over a set amount of time. Therefore, in instances where all timesteps of the input sequence are available, bidirectional LSTMs train two instead of one LSTMs on the input sequence. The first on the input sequence as-is and the second on a reversed copy of the input sequence. This can provide additional context to the network and result in faster and even fuller learning.

In addition, Convolutional Neural Networks (CNNs) may be used in some embodiments on datasets that include images and/or video. CNNs are a type of deep learning model in which trainable filters and local neighborhood pooling operations are applied alternatingly on raw input images, resulting in a hierarchy of increasingly complex features. CNNs can achieve superior performance on visual object and action recognition tasks without relying on hand-crafted features. Thus, these types of neural networks have proven very effective in visual object and action recognition and classification.

In addition, a contextual and user-personalization engine 140 may be developed in some embodiments. This particular engine 140 is designed to identify and provide information on a particular-user's habits and/or idiosyncrasies that can be used to enhance identifying a response to a query by the particular end-user. For example, such information may be used to identify which models should be run for the particular end-user. For instance, the end-user may be known to have a habit of moving his or her head often. Therefore, such knowledge may indicate that a model trained to identify this particular personification and/or the movement in general should be used. In addition, such information may be used to enhance or discredit certain predictions of physiological and/or psychological conditions being exhibited by the end-user based on the end-user's known habits and/or idiosyncrasies. For instance, if the particular end-user is known to have a habit of moving his or her jaw often, then the prediction with respect to the end-user making a jaw movement to indicate a response may be adjusted to account for this habit.

Once the models have been developed for the different physiological and psychological conditions (the different actions and/or reactions), these models can then be used in developing various interfaces for individuals with physical challenges. Accordingly, in various embodiments, a conversation designer 145 is provided that allows for an individual (e.g., a design engineer) to design an interface for one or more end-users. Here, a particular end-user (or a caretaker of the particular end-user) may be provided with an interface that presents the end-user with various action options that the end-user can select from. This allows the end-user to identify actions that the end-user is capable of performing. For example, the end-user may indicate he or she is able to move his or her jaw, blink his or her eyes, and make audible sounds. In addition, the end-user may identify preferred actions for various responses. For example, the end-user may indicate he or she prefers to blink once for yes and twice for no. Further, the end-user (or someone assisting the end-user) may identify what monitoring devices/equipment are available for use by the end-user. This allows a mapping of available actions to be built for the end-user that can then be used by the design engineer in designing an interface for the end-user. However, in some embodiments, the pairing of physical actions and response options may be performed based on predefined system configuration data and without direct user input.

Once the end-user has identified his or her capabilities, preferences, and/or available monitoring devices/equipment, the design engineer builds various queries that may be presented to the end-user through the interface by using the conversation designer 145. Here, in particular embodiments, this involves the design engineer designing a conversation decision tree data object (conversation decision space tree data object 150) providing a hierarchical structure having the one or more queries and corresponding candidate response options for the queries as nodes within the structure of the tree 150. Accordingly, these queries and response options can serve as dependent nodes with respect to each other within the structure of the tree 150. In addition, the hierarchy of the tree 150 often starts with an initial query (e.g., an initial question) with one or more candidate response options to the query.

For example, the initial query may be a question asking the end-user "did you take your medication today?" The candidate responses may include "yes," "no," "I took it partially," and "don't want to talk, get me out of here." A particular candidate response may then lead to a further query. For example, the tree 150 may be structured so that if the end-user responds with the candidate response "yes" to the first query, then a second query may be presented to the end-user asking him or her "are you feeling better?" Therefore, the structure continues to branch out into nodes representing additional queries with dependent nodes of corresponding response options. Accordingly, a response option may further branch to a dependent node that represents another query. This branching structure may be continued for the tree 150 until the entire conversation that is to be conducted through the interface has been mapped into a hierarchical structure. Thus, this hierarchical structure is then used to lead/guide the conversation with the end-user through the interface.

A similar type of tree 150 can be built for other types of queries besides questions. For example, the design engineer may be designing an interface for a remote control to a device such as a motorized wheelchair. Here, the queries are associated with commands for controlling the wheelchair such as moving forward or in reverse. Therefore, the structure of the tree 150 may involve an initial query of four buttons that are to be displayed on the interface. Here, the buttons may include "park," "forward," "reverse," and "turn off." Thus, the dependent nodes for this initial query are the responses for selecting each of the buttons. Further, a second query may be a dependent node of the response for selecting the "forward" button on the interface. Here, the second query may provide three buttons "slow," "medium," and "fast" for the speed with three dependent responses for each of the buttons.

As the design engineer develops the conversation decision space tree 150, the conversation designer 145 provides the engineer with the different physiological and psychological conditions (actions and/or reactions) that are available for the particular end-user based on the end-user's capabilities, preferences, and/or available monitoring devices/equipment. For example, the end-user may have indicated he or she can blink his or her eyes once, blink his or her eyes twice, and move his or her jaw. In addition, the end-user may have indicated a preference of blinking his or her eyes once for the response "yes." Therefore, the design engineer may be provided these different actions and preferences as options to use for identifying a particular response option. In addition, the conversation designer 145 may provide the engineer with different reactions such as, for example, positive sentiment, negative sentiment, high intensity, medium intensity, and low intensity. These options may be made available based on the end-user having equipment that is able to capture the physiological data (e.g., brainwaves) needed to predict these psychological conditions. Further, the conversation designer 145 may provide the engineer with different user personification actions.

At this point, the engineer identifies a combination of actions and/or reactions for each response to a query. For example, the engineer may identify the action of eye blinking with positive sentiment for the response option "yes." Therefore, during an interaction with the end-user when the associated query is being presented to the end-user, a detection of the end-user blinking his or her eyes along with a positive sentiment will indicate that the end-user is responding "yes" to the query. Accordingly, the engineer may identify any combination of actions and/or reactions for a response. However, in general, the combination for each response should be unique with respect to the combinations for the other responses for the query.

Once the conversation decision space tree 150 has been completed, the tree 150 can then be used in presenting various queries to the end-user through the corresponding interface. For example, the interface may be a Web interface, mobile device, or service interface 170. Accordingly, in particular embodiments, the interface may be facilitated through a conversation engine 165. Here, the conversation engine 165 may provide the interface with the various queries and corresponding responses found in the decision space tree 150 during an interaction with the end-user. In turn, the interface 170 collects physiological data 160 from different monitoring devices being used by the end-user as he or she performs actions to respond to the various queries. This data 160 is provided to the model orchestrator that is serving the interface 155.

In turn, the model orchestrator 155 provides the collected physiological data as input to the various machine learning models, and each model provides a prediction as to whether the end-user performed the associated action or is experiencing the associated reaction for the model. The conversion engine 165 then uses these model predictions along with the conversation decision space tree 150 to identify which of the responses the end-user has selected with respect to the current query. The engine 165 may then provide a "follow-up" query found in the tree 150 to the interface based on the response. Further, the model orchestrator 155 may have the collected physiological data saved along with the appropriate data sets for the detected actions and reactions so that the models may be further fine-tuned.

Thus, a conversation can be conducted with the monitored end-user in this manner through the interface that allows for the end-user who have limited physical capabilities to interact and respond with the interface. As previously mentioned, embodiments of the invention facilitate such an interface through the monitoring of various physiological data to identify actions being performed and reactions being exhibited by the end-user and corresponding these actions and reactions to response options selected by the end-user. In particular embodiments, brainwave data is collected and used during an interaction in combination with other monitored physiological data. This capability allows for the detection of physiological actions being carried out by the end-user, as well as psychological reactions being experienced by the end-user, that may not normally be detectable because of the end-user's physical limitations. As such, various embodiments provide enhance capabilities in detecting the end-user's responses to queries presented through the interface.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Figure 2:
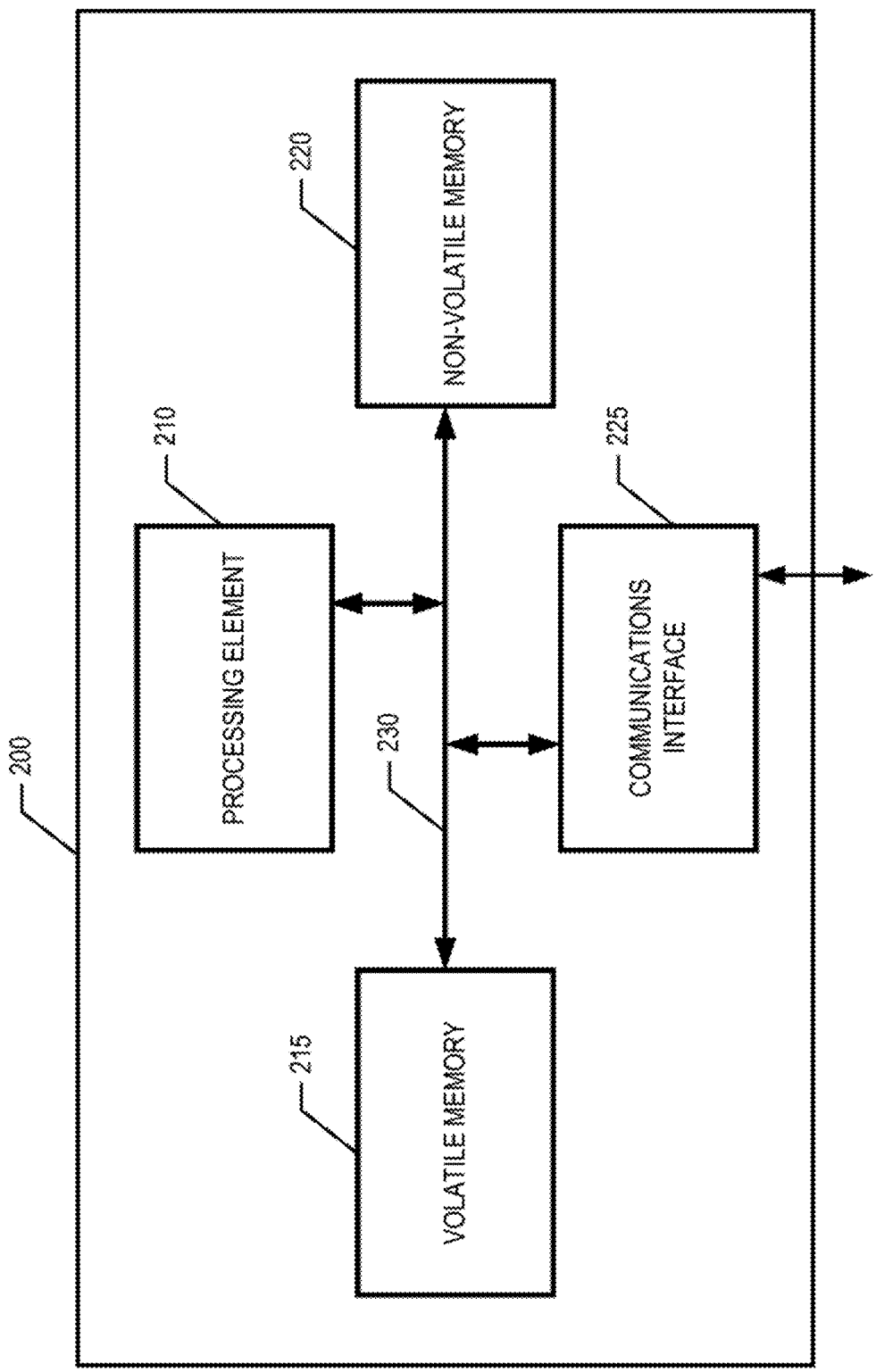
FIG. 2 is a schematic of a computing entity that can be used in accordance with various embodiments of the present invention.

FIG. 2 provides a schematic of a computing entity 200 that may be used in accordance with various embodiments of the present invention. For instance, the computing entity 400 may host one or more of the data collector 110, data collaborator 125, model orchestrator 135, contextual and user-personification engine 140, conversion designer 145, and/or conversation engine 165 found within the system architecture 100 previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present invention when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage (e.g., a repository 130) in which some or all the information/data required for various embodiments of the invention may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Data Collector Module

Figure 3:
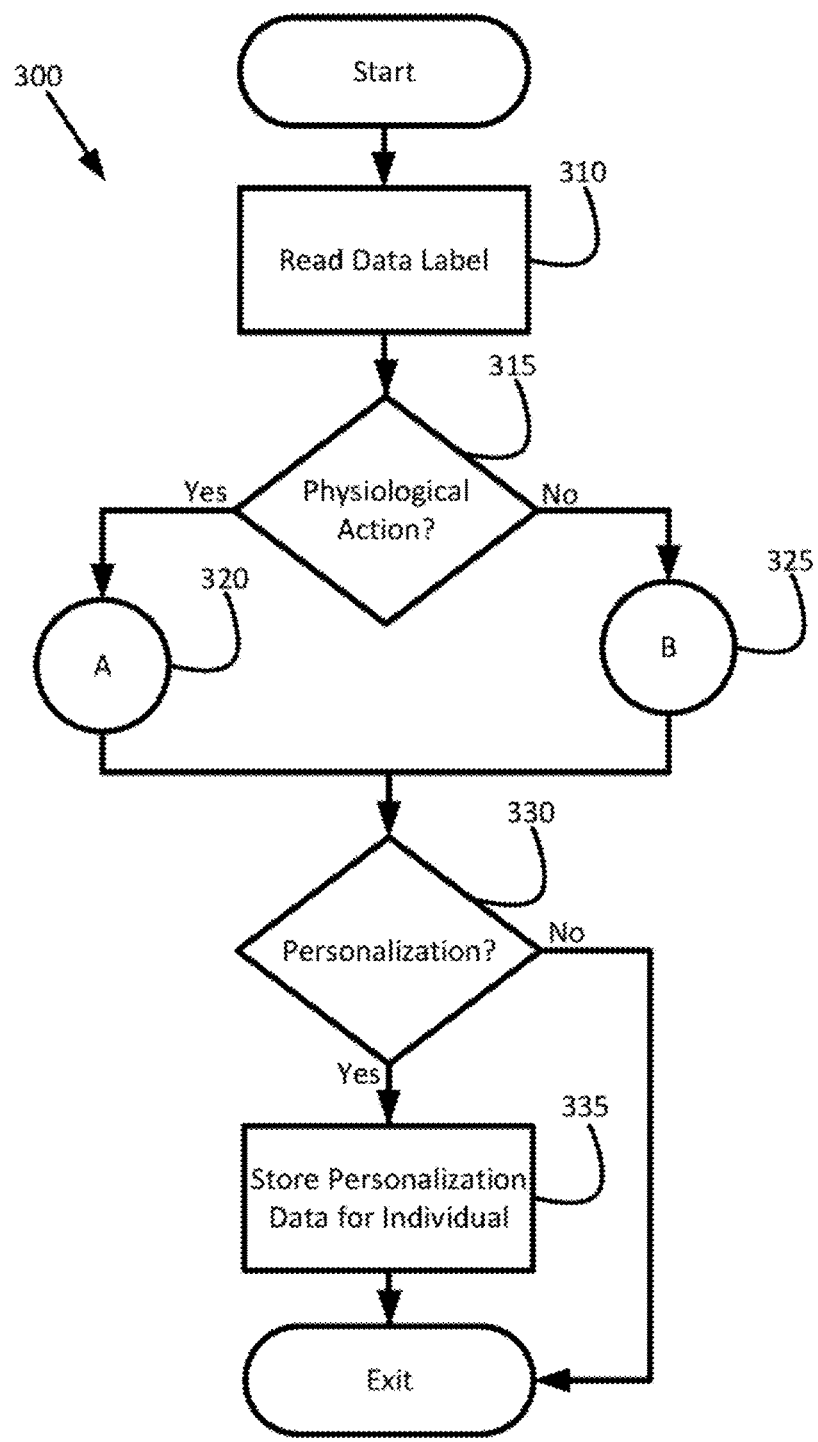
FIG. 3 is a process flow for collecting physiological and psychological data from individuals in accordance with various embodiments of the present invention.

Turning now to FIG. 3, additional details are provided regarding a process flow for receiving and processing data received from monitoring an individual according to various embodiments. FIG. 3 is a flow diagram showing a data collector module for performing such functionality according to various embodiments of the invention.

As previously noted, ground truth data is collected for a number of different individuals using several different types of monitoring devices. For instance, an individual may be monitored by several different types of instruments to gather physiological and psychological data from the individual based on various scenarios carried out by the individual as instructed by an observer. For example, the individual may be hooked up to an EEG sensor, motion sensors for various body parts, blood pressure cuff, heart rate monitor, throat sensor, sweat patch, etc. In addition, the individual may be monitored by observation equipment such as video, image, and/or audio recording equipment. Accordingly, data collected from a particular monitoring device during one of the scenarios is labeled and sent to the data collector module for processing.

Thus, the process flow 300 begins in various embodiments with the data collector module reading the data label for data received from monitoring the individual in Operation 310. Depending on the embodiment, the data label may provide different information. However, in general, the data label provides what the data represents and an associated physiological and/or psychological condition represented by the data. For example, the data label may indicate the data is brainwave data collected from a headband sensor while the individual was moving his or her jaw. In addition, the data label may indicate additional information such as information identifying the individual, conditions of the individual such as the individual is paralyzed from the neck down, and/or the type and make of the sensor/equipment used to capture the data. Those of ordinary skill in the art can envision other information that may be provided in the data label in light of this disclosure.

Once the data collector module has identified the type of data and associated action or reaction, the module determines whether the data is associated with a physiological condition in Operation 315. For example, the data label may indicate the data is brainwave data collected at a time when the individual was blinking. If the data is associated with a physiological condition, then the data collector module will add the noted data to the appropriate dataset for the associated physiological action in Operation 320.

Here, in particular embodiments, the data collector module performs this operation by invoking a physiological data collaborator module. As described further herein, the physiological data collaborator module is configured to store the data along with a dataset for the particular action associated with the data. For example, if the associated action is the individual moving his or her jaw, then the physiological data collaborator module stores the data along with the dataset for jaw movement data. As discussed further herein, this dataset is then used in developing and training a machine learning model for predicting when an individual is moving his or her jaw during a future interaction based on similarly monitored physiological data.

If the data is not associated with a physiological condition, then the data collector module saves the data with the appropriate psychological condition dataset in Operation 325. In a similar fashion, the data collector module performs this operation in particular embodiments by invoking a psychological data collaborator module. In turn, the psychological data collaborator module stores the data along with the appropriate dataset for the associated psychological condition. For example, the information may be saved along with a negative sentiment dataset. In addition, the psychological data collaborator module may save intensity information along with an appropriate dataset if such information is provided with the data.

At this point, the data collector module determines whether the data includes any personalization information for the individual in Operation 330. As previously noted, information on the individual's personal habits and/or idiosyncrasies may be collected during a scenario. This information can be used in "fine-tuning" observations made of the individual in the future. In addition, such information may be used in developing and/or selecting machine learning models to recognize such habits and/or idiosyncrasies. Thus, if the data does include personalization information, then the data collector module stores such information for the individual in Operation 335. In addition, the data collector module may save the data along with the appropriate personification dataset. The process flow 300 then ends.

Physiological Data Collaborator Module

Figure 4:
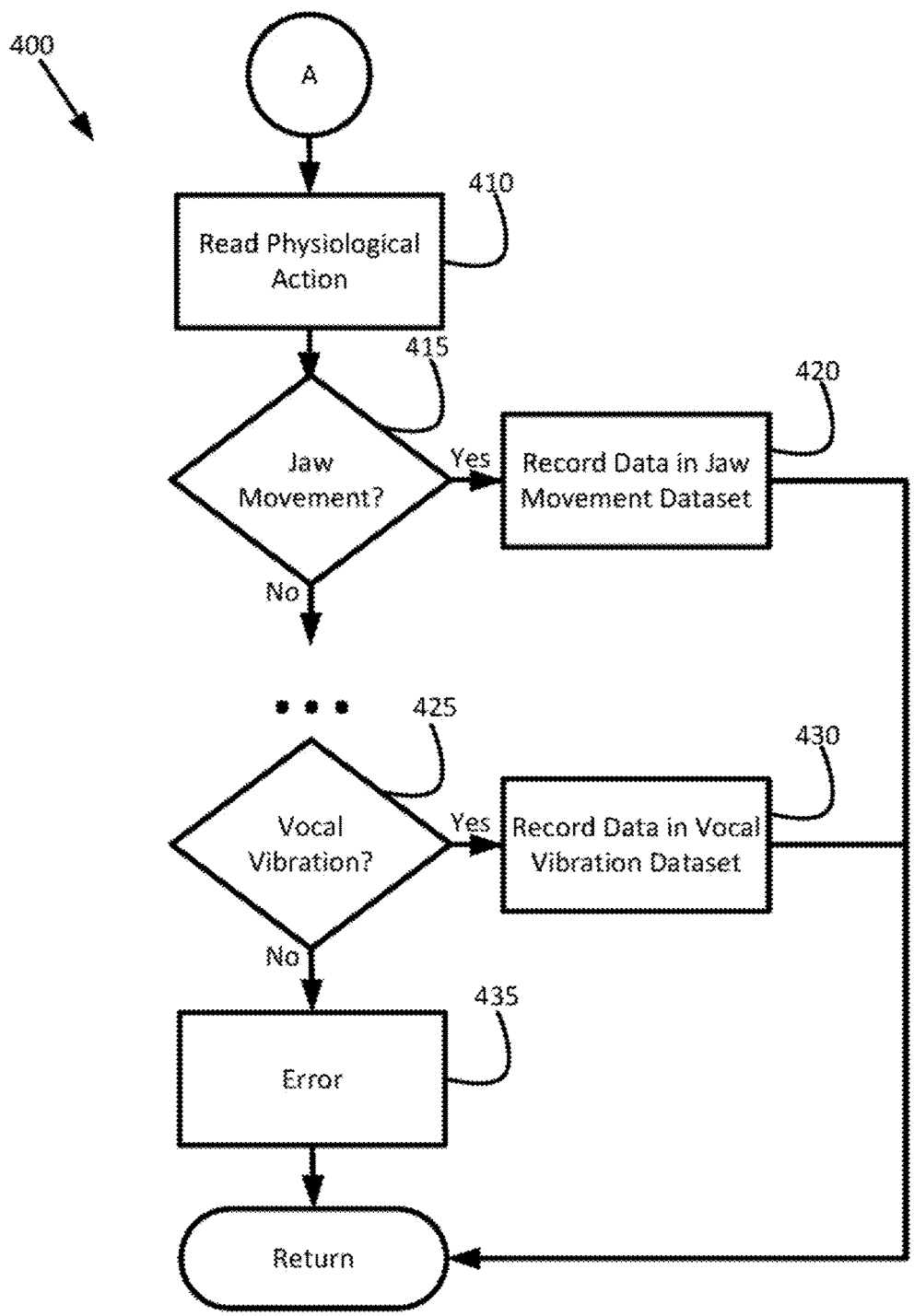
FIG. 4 is a process flow for collecting physiological data in accordance with various embodiments of the present invention.

Turning now to FIG. 4, additional details are provided regarding storing data for a physiological condition along with the corresponding dataset according to various embodiments. FIG. 4 is a flow diagram showing a physiological data collaborator module for performing such functionality according to various embodiments of the invention. As previously mentioned, the physiological data collaborator module may be invoked by another module in particular embodiments to store data for a physiological condition such as, for example, the data collector module previously described. However, with that said, the physiological data collaborator module may not necessarily be invoked by another module and may execute as a stand-alone module in other embodiments.

The process flow 400 begins with the physiological collaborator module reading the physiological condition (action) associated with the data in Operation 410. For example, the data may have been collected during a time that the individual who was being tested was moving his or her jaw. Once the physiological collaborator module determines the physiological condition associated with the data, the module saves the data along with the appropriate dataset.

Thus, in various embodiments, the physiological data collaborator module determines whether the data is associated with jaw movement in Operation 415. If so, then physiological data collaborator module stores the data along with the jaw movement dataset in Operation 420. The physiological data collaborator module is configured to continue in a similar fashion to determine whether the data is associated with each of the physiological conditions for which a dataset is being stored until the corresponding dataset for the data is determined. For example, the physiological data collaborator module may determine whether the data is associated with vocal vibrations in Operation 425. If so, then the physiological data collaborator module stores the data along with the vocal vibrations dataset in Operation 430. It is noted that the physiological data collaborator module may be configured in particular embodiments to store the data for more than one dataset. For example, the data may be brainwave data that was collected while the individual was both blinking his or her eyes and tilting his or her head.

In addition, the physiological data collaborator module may be configured in particular embodiments to communicate an error for the data in Operation 435 if the data is not associated with any of the physiological dataset being stored. For example, the physiological data collaborator module may send an error message to appropriate personal or write a message to an error file indicating an appropriate dataset could not be identified for data. At this point, the process flow 400 ends.

Psychological Data Collaborator Module

Figure 5:
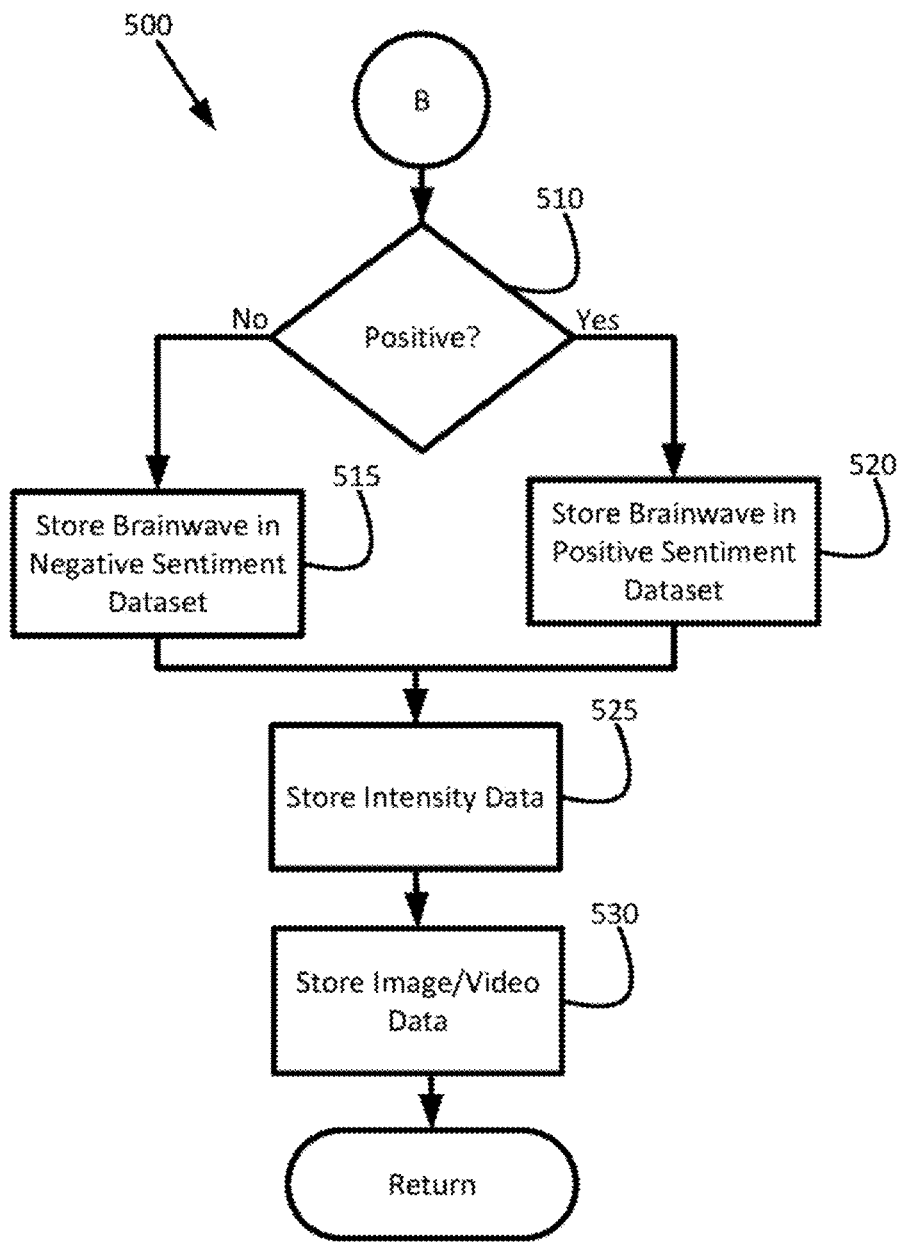
FIG. 5 is a process flow for collecting emotional sensitivity (e.g., sentiment) data in accordance with various embodiments of the present invention.

Turning now to FIG. 5, additional details are provided regarding storing data associated with a psychological condition along with the corresponding dataset according to various embodiments. FIG. 5 is a flow diagram showing a psychological data collaborator module for performing such functionality according to various embodiments of the invention. As previously mentioned, the psychological data collaborator module may be invoked by another module in particular embodiments to store psychological data such as, for example, the data collector module previously described. However, with that said, the psychological data collaborator module may not necessarily be invoked by another module and may execute as a stand-alone module in other embodiments.

As previously noted, an individual may be run through various scenarios to attempt to invoke certain emotions in the individual such as, for example, happiness, joy, anxiety, stress, discomfort, etc. These emotions are generally considered to be positive sentiment or negative sentiment. Accordingly, the individual's brainwaves may be measured during these scenarios. In addition, an intensity may be identified with respect to the emotion being experienced by the individual. Therefore, the data received for the individual may include brainwaves gathered from the individual during a time when the individual was experiencing, for example, a high level of sadness.

The process flow shown in FIG. 5 is configured to store data for psychological conditions based on whether the data represents positive sentiment or negative sentiment. Here, the data is generally associated with brainwaves collected from an individual while experiencing positive or negative sentiment. However, those of ordinary skill in the art should recognized that datasets can be established in various embodiments with respect to other categories depending on the application. For example, a dataset may be established for a sadness condition, a happy condition, a like condition, a dislike condition, a stressful condition, etc. and these datasets can be used in developing machine learning models for each of the categories.

Thus, the process flow 500 begins in FIG. 5 with the psychological data collaborator module determining whether the brainwaves are for positive sentiment in Operation 510. If not, then the brainwaves are deemed to be associated with negative sentiment. Here, the psychological data collaborator module stores the data along with the negative sentiment dataset in Operation 515. If the data is deemed to be associated with positive sentiment, then the psychological data collaborator module stores the data along with the positive sentiment dataset in Operation 520.

In addition, the psychological data collaborator module is configured in this particular instance to store the data in an appropriate intensity dataset if applicable in Operation 525. As noted, the data may indicate a magnitude with respect to the sentiment being experienced by the individual at the time the data was collected. For example, the intensity may be identified as either low, medium, or high.

Furthermore, the psychological data collaborator module may be configured to store any image/video data that is provided along with the brainwave data in Operation 530. Here, in particular embodiments, a machine learning model may be trained using such data to recognize different kinds of emotional (sentiment) responses individuals provide based on different scenarios using image and video annotations. At this point, the process flow 500 ends.

Conversation Designer Module

Figure 6:
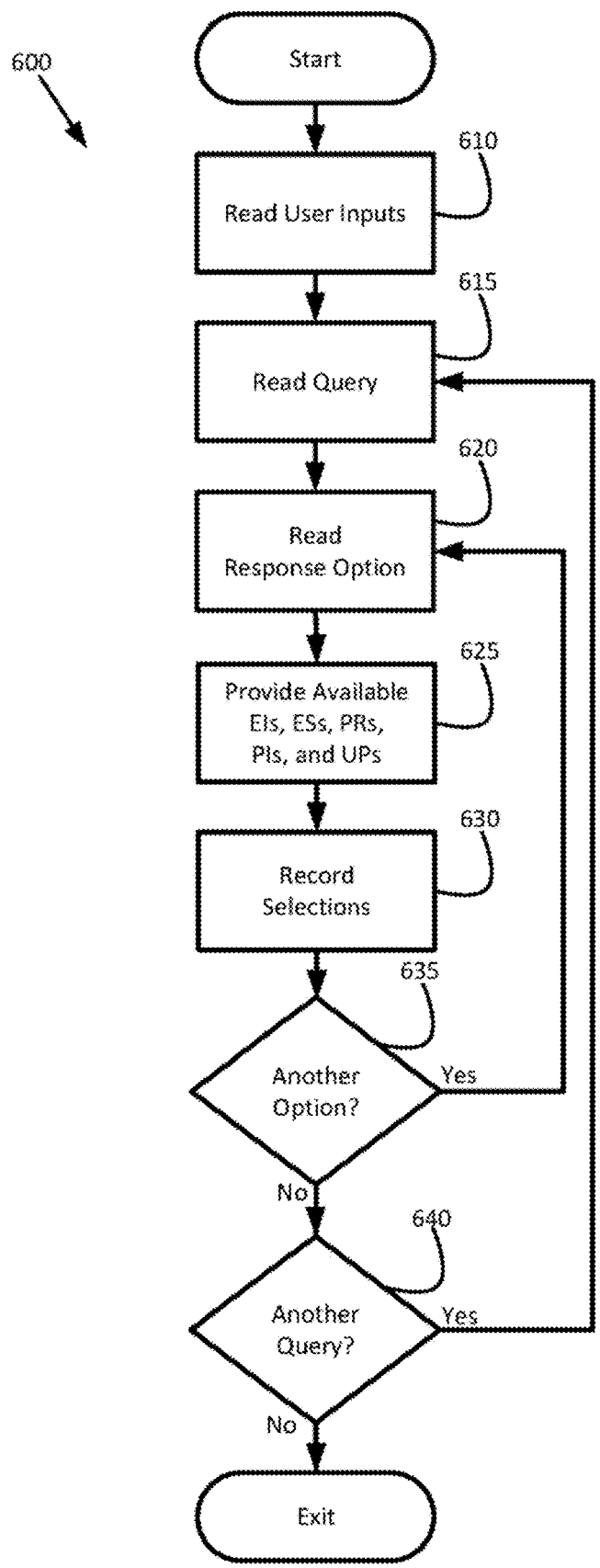
FIG. 6 is a process flow for designing a conversation in accordance with various embodiments of the present invention.

Turning now to FIG. 6, additional details are provided regarding a process flow for designing a conversation to be presented on an interface according to various embodiments. FIG. 6 is a flow diagram showing a conversation designer module for performing such functionality according to various embodiments of the invention.

At previously noted, an interface tool may be provided (e.g., caused to be presented by one or more display devices) in various embodiments that allows an individual (design engineer) to construct a conversation that may be presented through some type of interface. For example, the conversation may involve a group of questions and answers that are presented through an interface for a device used in a medical facility to inquire about an individual's wellbeing. Here, the individual may be asked an initial question about how he or she is feeling and based on the individual's response, additional questions may be posed to the individual through the interface. Accordingly, the individual may be monitored using one or more sensors and/or monitoring equipment so that he or she can perform actions that are captured through the sensors/equipment to respond to the questions. Therefore, in this instance, a user may use the interface tool to construct this conversation.

In various embodiments, other types of "conversations" may be constructed as well that do not necessarily involve questions and answers. For instance, the user may wish to construct a conversation that involves commands that may be selected through an interface to control a device. For example, the device may be a thermostat used in a home to control temperature, heating, air conditioning, etc. and the interface may provide commands that can be used to set the temperature, heating, air conditioning, etc. This interface may be provided directly on the device or as a separate application (e.g., an "app" downloaded to a mobile device) that communicates with the device through a network such as the Internet (e.g., IoTs).

Therefore, the conversation may involve various queries presented to an end-user through the interface along with corresponding response options. For example, a query may involve "set temperature" and the corresponding response options may include a first button with a "+" sign to increase temperature and a second button with the "−" to decrease temperature. Here, an end-user who is using the interface to set the temperature on a thermostat would perform one or more actions (e.g., blink once) to select the first button on the interface to increase the temperature and one or more other actions (e.g., blink twice) to select the second button on the interface to decrease the temperature.

In this instance, once the end-user has selected the first or second button, the interface may then present a second query to the end-user on "number of degrees." Response options may be provided along with the second query that include buttons for "one degree," "three degrees," "five degrees," and "seven degrees." Again, the end-user may then perform one or more actions to select any one of the response options. Therefore, in various embodiments, the design engineer may use the interface tool to construct this conversation to control the thermostat by laying out the queries and corresponding response options as nodes in a hierarchical construct referred to as a conversation decision tree.

Therefore, turning now to FIG. 6, the process flow 600 begins with the conversation designer module reading inputs entered by the design engineer on the interface tool in Operation 610. For example, the design engineer may enter information for the first query for setting the temperature. In addition, the design engineer may enter the response options for the first query. That is, the design engineer may enter the "+" response option and the "−" response option. Accordingly, the conversation designer module selects the first query in Operation 615 and selects a response option for the query in Operation 620. That is say in the example, the conversation designer module reads the first query "set temperature" and the first response option for the query, the "+" button.

As previously noted, a gathering interface may also be used to capture the actions that can be performed by a particular end-user (e.g., the end-user's capabilities) as well as the end-user's preferences and/or in some cases, the end-user's reactive states and/or what sensors and monitoring equipment are available to monitor the end-user. For example, the end-user may be presented with an extensive set of body movements that can be identified by him or her through the gathering interface as appropriate to use based on the end-user's capabilities. In addition, the end-user may identify preferences for certain responses. For example, the end-user may identify a preference of blinking once for "yes" and twice for "no." Additional information may be gathered on the end-user such as brainwave data to help in tuning psychological responses and personalization information.

Therefore, returning to FIG. 6, the conversation designer module provides the design engineer with the available physiological and psychological conditions (actions and reactions) for the particular end-user who the interface is being designed for in Operation 625. In various embodiments, these actions and reactions involve physiological responses (PRs) such as blinking one's eyes, moving one's jaw, moving one's fingers or toes, etc., physiological intensities (PIs) associated with the various physiological responses, emotional sensitivities (ESs), and emotional intensities (EIs). Here, the design engineer may select from the available PRs, PIs, ESs, and EIs in any combination for the response option that will then be used to identify when the end-user has selected the particular option for the query. For example, the PRs available for the end-user may include blinking eyes once, blinking eyes twice, and tilting head. Here, the design engineer may select blinking eyes once as the action to be performed by the end-user to select the response option "+" button.

Once the design engineer has selected the combination of available actions and reactions for the response option, the conversation designer module saves the response option and corresponding combination in Operation 630. Thus, in various embodiments, the response option is added as a dependent node in the conversation decision tree for the first query. At this point, the conversation designer module determines whether another response option is available for the query in Operation 635. If so, then the conversation designer returns to Operation 620, reads the next response option for the query, and performs the operations just discussed for the newly selected response option. It is noted that typically a unique combination of actions and reactions should be identified for each response option so that the end-user can perform actions and/or react to distinguish between the options when selecting one while interacting with the interface.

Once the design engineer has identified the combination of actions and reactions for all the response options for the query, the conversation designer module determines whether another query is to be included in the conversation decision tree in Operation 640. For instance, a second query may be associated with a particular response option such as in the example, the query "number of degrees" may be associated with each of the response options "+" button and "−" button. If another query is to be added to the conversation decision tree, then the conversation designer module returns to Operation 615, selects the next query, and performs the operations already discussed for the newly selected query. Accordingly, the conversation is incorporate into the conversation decision tree with the queries and corresponding response options placed as nodes and dependent nodes within the tree at the conclusion of the process flow 600.

It is noted that the conversation designer module may be configured in various embodiments to re-used conversation decision trees for building interfaces for additional end-users. For instance, in the example, the conversation decision tree for setting the temperature may be re-used for building an interface to the thermostat for a second, different end-user. Here, the design engineer may select the temperature setting conversation decision tree as input and the conversation designer then works through the nodes of the tree to allow the design engineer to set up the combination of actions and reactions for each of the response options for the different queries based on the second end-user's capabilities and preferences. In this way, an interface for a particular device (e.g., an interface for the thermostat) can be customized based on an end-user's capabilities and preferences with minimal effort.

Figure 7:
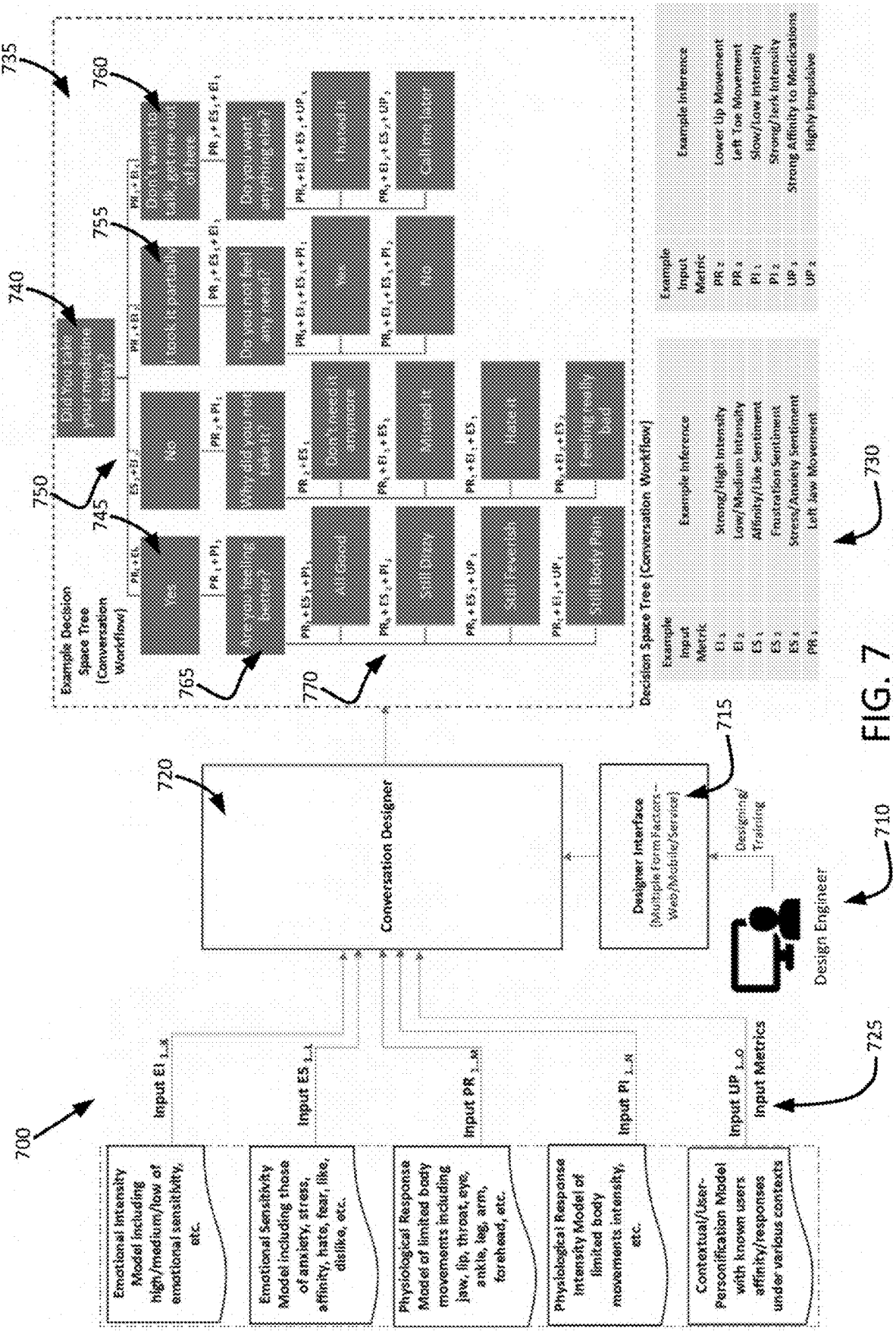
FIG. 7 is an overview of designing a conversation in accordance with various embodiments of the present invention.

Turning now to FIG. 7, this figure provides an overview 700 of designing a conversation for an interface to be used by a particular end-user according to various embodiments. The design engineer 710 works through the interface 715 to use the conversation designer 720 to design a conversation decision tree for the conversation. Here, the different actions and reactions ($EI_1 \ldots EI_k$, $ES_1 \ldots ES_l$, $PR_1 \ldots PR_m$, $PI_1 \ldots PI_n$, $UP_1 \ldots UP_o$) 725 available for the end-user are accessible so that the design engineer 710 can build combinations of the actions and reactions for the various response options for the different queries that make up the tree.

An example set of available actions and reactions 730 are shown along with an example of a conversation decision tree 735. For instance, the Di reaction represents a strong/high emotional intensity and the $PR_1$ action represents a left jaw movement. The conversation decision tree 735 includes the query "Did you take your medicine today?" 740 as the top node of the tree 735. Here, the conversation decision tree 735 represents a conversation that involves checking on whether the individual is taking his or her medication and how the individual is feeling as a result of taking or not taking his or her medication.

The tree 735 provides four response options ("Yes" 745, "No" 750, "I took it partially" 755, and "Don't want to talk, get me out of here" 760) for the initial query 740. Each of the response options 745, 750, 755, 760 includes a combination of the available actions and reactions that are used to identify when the end-user has selected the particular response option. For example, the response option "Yes" 745 is associated with the combination of the action lower lip movement ($PR_2$) and reaction strong/high emotional intensity ($EI_1$). Therefore, when the query "Did you take your medicine today?" 740 is provided to the end-user through the interface, detection of the combination of this action and reaction would indicate he or she has responded "Yes" 745 to the query.

In this example, the decision space tree 735 includes a second query "Are you feeling better?" 765 as a dependent node of the response option "Yes" 745. Therefore, as a result of detecting the end-user's response to the first query being "Yes" 745, he or she is then presented with the second query 765. Accordingly, this query 765 has associated response options 770 that the end-user can then use to respond to the query 765. Thus, the decision space tree 735 provides a conversation hierarchical flow that is presented through the interface to inquire as to whether the end-user is taking his or her medication and to present further queries based on whether or not the end-user is taking his or her medication.

Conversation Engine Module

Figure 8:
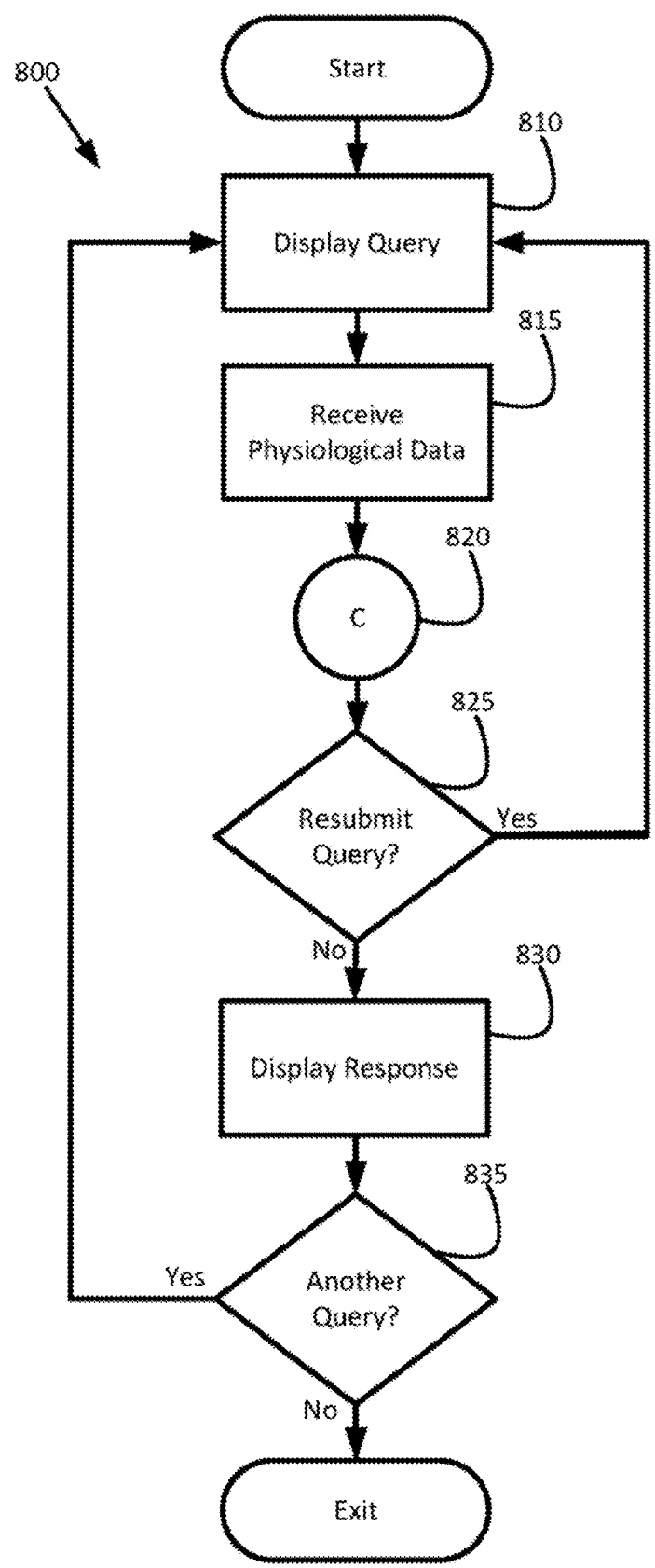
FIG. 8 is a process flow for conducting a query in accordance with various embodiments of the present invention.

Turning now to FIG. 8, additional details are provided regarding a process flow for conducting a conversation through an interface according to various embodiments. FIG. 8 is a flow diagram showing a conversation engine module for performing such functionality according to various embodiments of the invention.

As previously noted, interfaces may be designed/developed in various embodiments for different applications. For example, an interface may be designed for a medical application for monitoring patients, to be used as a communication tool, for operating a device and/or equipment, for conducting an Internet conversational service, to be uses as an emergency response application, for conducting a service such as a payment service, etc. Those of ordinary skill in the art can envision various types of interfaces can be designed/developed for different applications in light of this disclosure.

Accordingly, the conversation engine module shown in FIG. 8 is configured to conduct a conversation for one of these interfaces based on a conversation decision tree designed for the conversation. Therefore, the process flow 800 begins with the conversation engine module having a query displayed for the conversation on the interface in Operation 810. Here, the end-user who is interacting with the interface is being monitored using a number of different sensors to collect physiological data from the sensors. For example, the end-user's brainwaves, eye movement, jaw movement, and head movements may be monitored through a number of different devices. In addition, equipment may be used for imaging, video recording, and/or recording audio of the end-user. Therefore, the conversation engine module receives physiological data as a result of monitoring the end-user in Operation 815.

The conversation engine module then uses the physiological data to determine which of the response options the monitored end-user has selected for the query in Operation 820. Here, in particular embodiments, the conversation engine module performs this operation by invoking a response module and in turn, the response module determines which of the response options the end-user has selected based on the physiological data collected while monitoring the end-user.

In particular embodiments, if the response module is unable to identify one of the response options, then the module may report such to the conversation engine module. Accordingly, the conversation engine module may determine whether to resubmit the query on the interface in Operation 825. Here, resubmitting the query may simply involve continuing to display the query on the interface and collecting additional physiological data. While in other instances, resubmitting the query may involve communicating to the end-user that a response could not be determined and asking the end-user to respond again to the query.

If the conversation engine module determines that the query does not need to be resubmitted, then the conversation engine module has the identified response displayed on the interface in Operation 830. In addition, for particular applications, the conversation engine may have other operations performed such as, for example, having one or more commands submitted to control a device or equipment. Depending on the application, other operations may be carried based on the identified response to the query.

At this point, the conversation engine module determines whether another query is available based on the identified response in Operation 835. That is to say, the conversation engine determines whether the identified response has a dependent query in the conversation decision tree. If so, then the conversation engine module returns to Operation 810, has the next query displayed on the interface, and repeats the operations just described for the next query. This process flow 800 continues as the conversation engine module works through the conversation decision tree. As a result, monitoring of the end-user is continued and the end-user is able to communicate with the interface effectively based on monitored physiological data.

Response Module

Figure 9:
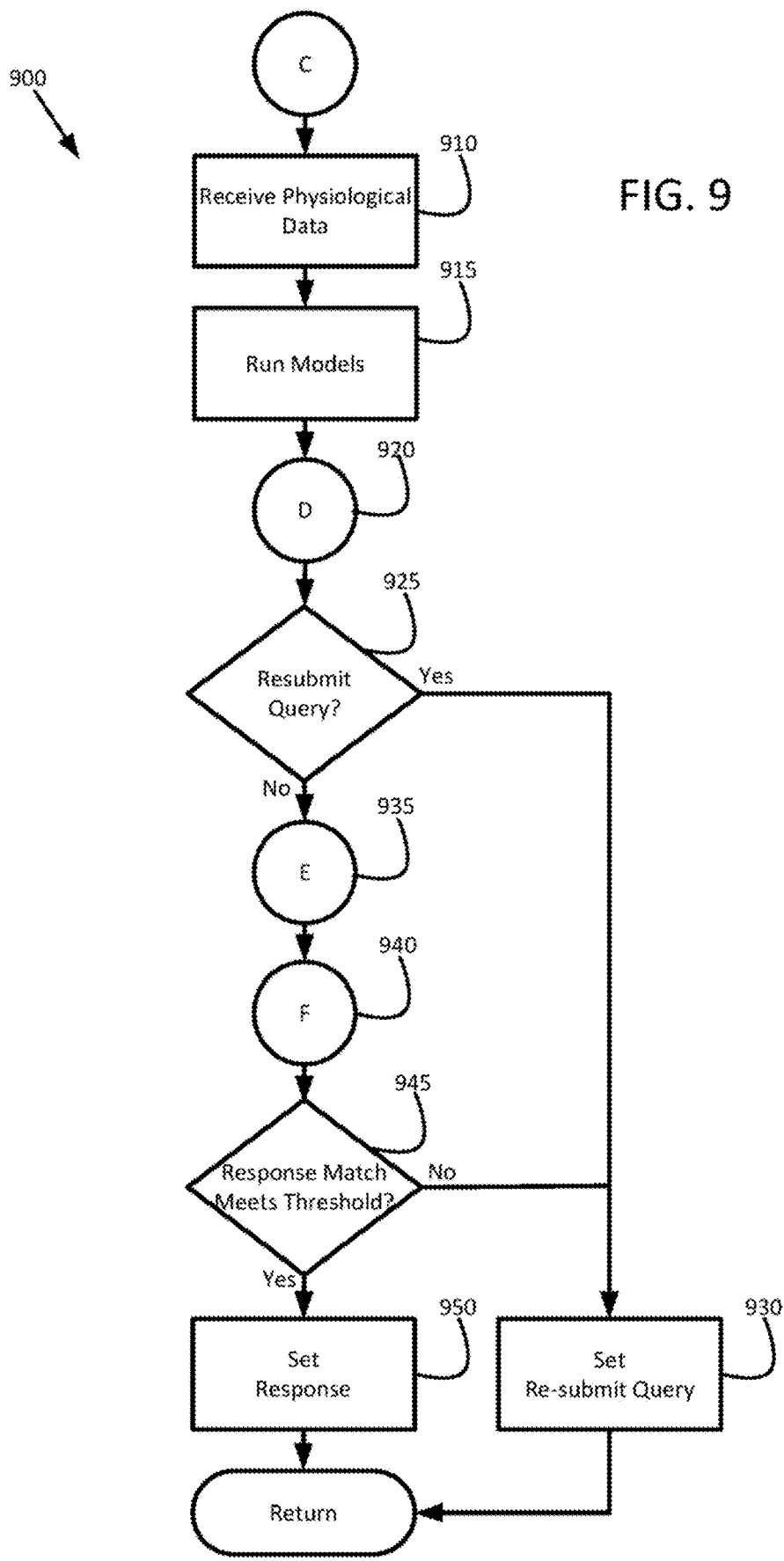
FIG. 9 is a process flow for identifying a response in accordance with various embodiments of the present invention.

Turning now to FIG. 9, additional details are provided regarding identifying which response option has been selected for a query by the end-user of the interface according to various embodiments. FIG. 9 is a flow diagram showing a response module for performing such functionality according to various embodiments of the invention. As previously mentioned, the response module may be invoked by another module in particular embodiments to identify a selected response option such as, for example, the conversation engine module previously described. However, with that said, the response module may not necessarily be invoked by another module and may execute as a stand-alone module in other embodiments.

The process flow 900 begins with the response module receiving physiological data in Operation 910 that has been collected as a result of monitoring the end-user who in interacting with the interface. For example, a query may have been presented to the end-user on the interface along with response options. As a result, the end-user may perform one or more actions to attempt to select one of the response options and physiological data may be collected accordingly.

The response module then runs the various machine learning models on the physiological data to identify what actions are being performed by the end-user, as well as what reactions the end-user is experiencing in Operation 915. In particular embodiments, the various machine learning models may be managed by a model orchestrator that carries out running the models for the response module. In addition, the machine learning models may identify an intensity with respect to the actions and/or reactions. As previously discussed, these machine learning models may be configured for predicting whether the end-user has performed various physiological actions such as eye blinking, jaw movement, finger movement, etc. In addition, models may be used to predict emotional sensitivity such as sentiment, as well as intensity with respect to physiological actions and emotional reactions. Here, the collected physiological data is provided as input to the models and predictions are produced with respect to the different physiological actions and/or emotional reactions.

At this point, the response module identifies a physiological response based on the predictions provided by the various machine learning models in Operation 920. Here, in particular embodiments, the response module performs this operation by invoking a physiological engine module and this module sets a physiological response (PR) based on a prediction for a particular physiological response meeting a threshold. In addition, in particular embodiments, the physiological engine module may be configured to also set an intensity (PI) for the identified physiological response.

The response module then determines whether the query needs to be resubmitted in Operation 925 because an acceptable physiological response could not be identified based on the predictions. In other words, the end-user's action(s) he or she performed to select a response option may not be determinable with a certain level of confidence based on the predictions produced by the machine learning models. Therefore, the response module may need to have the query resubmitted to attempt to identify the end-user's action(s) in Operation 930. As previously mentioned, resubmitting the query may involve simply collecting additional physiological data and/or instructing the end-user to perform the action(s) again to select the desired response option.

If a physiological response has been identified with an acceptable level of confidence, then the response module identifies an emotional sensitivity (e.g., sentiment) based on the predictions from the machine learning models in Operation 935. The response module performs this operation in particular embodiments by invoking a sentiment engine module and the sentiment engine module sets an emotional sensitivity (ES) based on the predictions with respect to detected sentiment meeting a threshold. In addition, the sentiment engine module may be configured to also set an intensity (EI) for the identified emotional sensitivity.

In addition, the response module identifies a user personification based on the predictions from the machine learning models in Operation 940. In similar fashion, the response module performs this operation in particular embodiments by invoking a personification engine module and the personification engine module sets a user personification (UP) based on the predictions with respect to the identified personification meeting a threshold.

It is noted that in some embodiments, the response module, physiological engine module, sentiment engine module, and/or personification engine model may be configured to identify more than one physiological action and/or emotional reaction based on the predictions produced by the machine learning algorithms. For example, the physiological engine may identify the predictions for both eye blinking and head tilt movement meets the threshold(s). Such a configuration may allow for more robust combinations of actions and/or reactions be defined for various response options. Therefore, an end-user may be able to use a combination of physiological actions to select a response choice.

At this point, the response module determines whether the physiological responses and corresponding intensities, emotional sensitivities and corresponding intensities, and/or user personifications identified from the physiological data corresponds to a particular response option with respect to a threshold in Operation 945. For example, the actions and reactions identified from the collected physiological data may include eye blinking at a high intensity, head tilting at a medium intensity, and positive sentiment at a high intensity. Here, one of the response options may be associated with the combination of eye blinking at a high intensity, jaw movement at a high intensity, and positive sentiment at a medium intensity. A threshold may be established that the detected actions and reactions must meet at least sixty percent of the actions and reactions found in a combination defined for a response option.

Therefore, although the detected actions and reactions do not exactly match the combination of actions and reactions associated with the particular response option, the detected actions and reactions do match the combination of actions and reactions with respect to the threshold. Here, a high intensity detected for the positive sentiment is interpreted to meet the medium intensity for the positive sentiment identified for the combination of actions and reactions defined for the response option.

If the detected actions and reactions are found to meet the threshold for a particular response option, then the response option is set as the response provided by the end-user in Operation 950. Accordingly, as previously discussed, the interface may be updated to reflect the end-user response in particular instances. In addition, one or more other operations may be carried out depending on the application such as a command may be provided to control the operation of a device or equipment.

Physiological Engine Module

Figure 10:
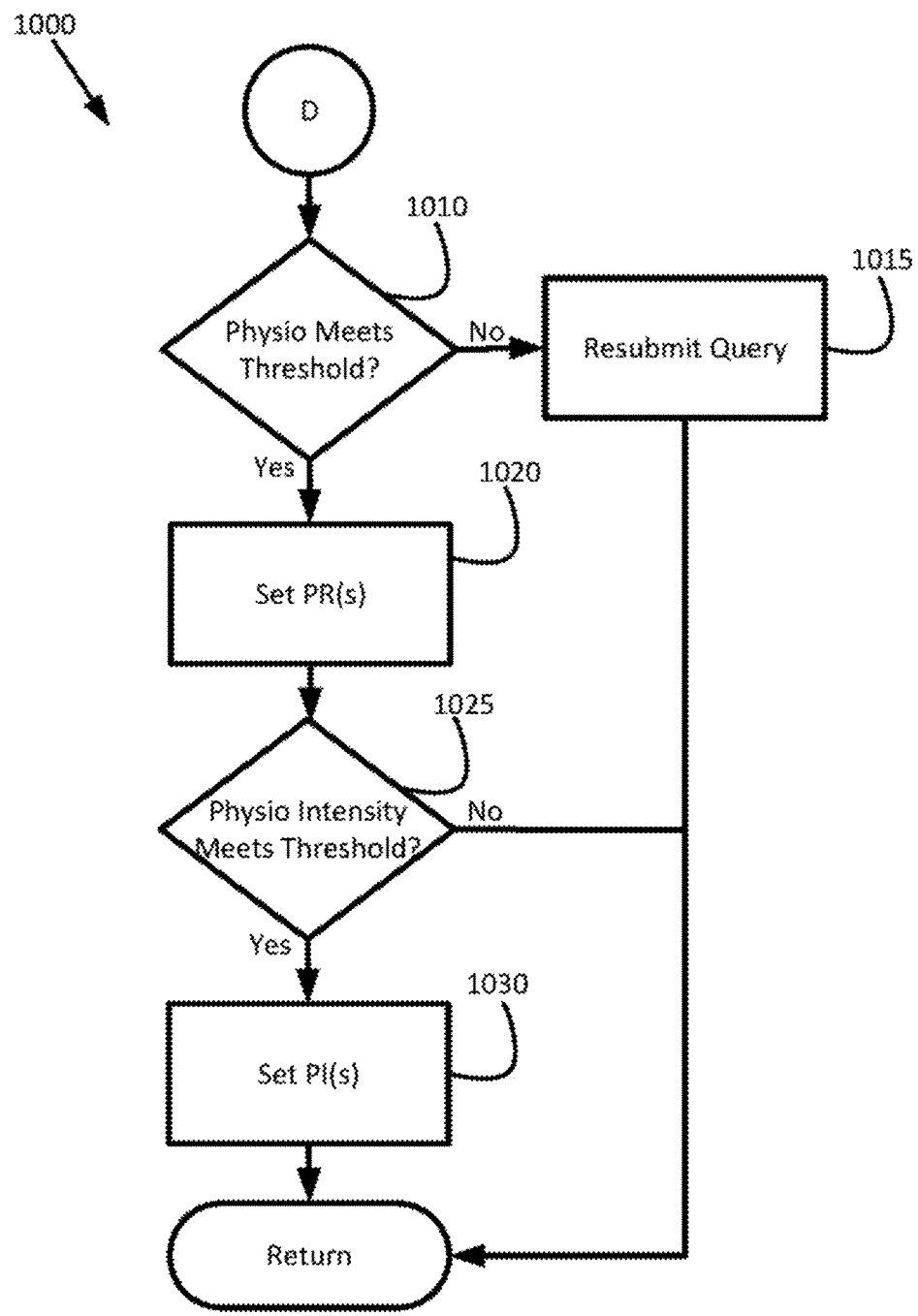
FIG. 10 is a process flow for identifying a physiological response in accordance with various embodiments of the present invention.

Turning now to FIG. 10, additional details are provided regarding identifying one or more physiological actions performed by an end-user based on collected physiological data according to various embodiments. FIG. 10 is a flow diagram showing a physiological engine module for performing such functionality according to various embodiments of the invention. As previously mentioned, the physiological engine module may be invoked by another module in particular embodiments to identify one or more physiological actions such as, for example, the response module previously described. However, with that said, the physiological engine module may not necessarily be invoked by another module and may execute as a stand-alone module in other embodiments.

Accordingly, the process flow 1000 begins with the physiological engine module determining whether any of the predictions provided by the machine learning models for the different physiological actions meet a threshold in Operation 1010. In particular embodiments, each of the predictions may be provided as a percentage representing a confidence the end-user has performed the corresponding physiological action. Here, for example, the threshold may be set at seventy percentage. Therefore, in this example, the physiological engine module identifies the physiological actions with predictions over seventy percentage as being performed by the end-user. Different thresholds may be used in different embodiments. In additional, different thresholds may be used for different physiological actions in some embodiments. Further, the threshold may simply be the physiological action having the highest prediction (percentage) of being performed by the end-user in some embodiments.

If none of the physiological actions were found to meet the threshold, then the physiological engine module may identify that the query needs to be resubmitted in Operation 1015. However, if at least one physiological action is found to meet the threshold, then the physiological engine module sets the physiological action(s) as being detected in the physiological data in Operation 1020.

Accordingly, the physiological engine module may be configured to perform the same evaluation with respect to intensity of the physiological action(s) detected in the physiological data. Therefore, the physiological engine module determines whether the prediction for the intensity identified for each of physiological actions detected in the data meets a threshold in Operation 1025. If so, then the physiological engine module sets the intensity for the corresponding physiological action in Operation 1030. At this point, the process flow 1000 ends.

Sentiment Engine Module

Figure 11:
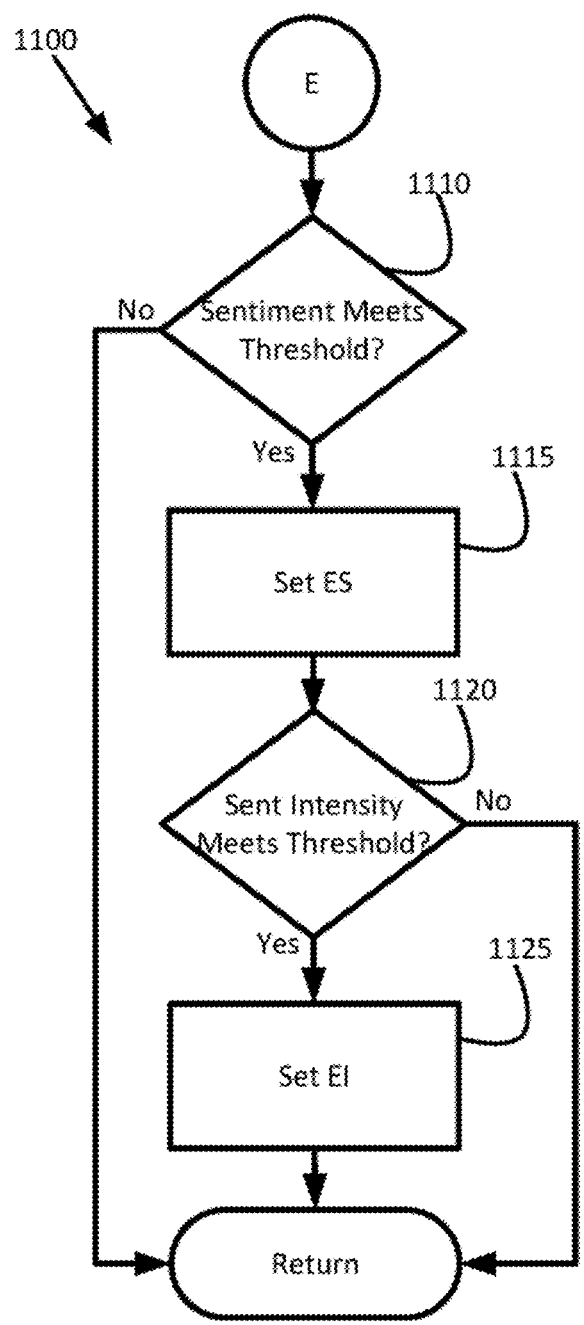
FIG. 11 is a process flow for identifying an emotional sensitivity (e.g., sentiment) response in accordance with various embodiments of the present invention.

Turning now to FIG. 11, additional details are provided regarding identifying one or more emotional reactions (sentiments) experienced by an end-user based on collected physiological data according to various embodiments. FIG. 11 is a flow diagram showing a sentiment engine module for performing such functionality according to various embodiments of the invention. As previously mentioned, the sentiment engine module may be invoked by another module in particular embodiments to identify one or more sentiments such as, for example, the response module previously described. However, with that said, the sentiment engine module may not necessarily be invoked by another module and may execute as a stand-alone module in other embodiments.

In this particular instance, the sentiment engine module is configured to identify the emotional sensitivity as either positive sentiment or negative sentiment. However, the sentiment engine module may be configured in other embodiments to identify other emotional sensitivities such as affinity/like, dislike, frustration, stress, etc.

The process flow 1100 begins with the sentiment engine module determining whether the prediction provided by the machine learning model for the sentiment meets a threshold in Operation 1110. As previously mentioned, the prediction may be provided as a percentage representing a confidence the end-user is experiencing positive or negative sentiment. If the sentiment prediction is found to meet either threshold, then the sentiment engine module sets the appropriate sentiment as being detected in the physiological data in Operation 1115.

For example, the threshold for identifying positive sentiment may be seventy percent and the threshold for identifying negative sentiment may be thirty percent. Therefore, if the machine learning model predicts the sentiment to be eighty-two percent, then the sentiment engine module would determine the prediction meets the positive sentiment threshold and set the sentiment detected in the physiological data accordingly. Likewise, if the machine learning model predicts the sentiment to be twenty-three percent, then the sentiment engine module would determine the prediction meets the negative sentiment threshold and set the sentiment detected in the physiological data accordingly. In this example, a prediction between seventy and thirty percent is viewed as neutral sentiment. Other thresholds may be used in other embodiments. In addition, separate predictions may be made for each of the sentiments. In addition, more than one machine learning model may be developed for sentiment (e.g., a positive sentiment model and a negative sentiment model).

Accordingly, the sentiment engine module may also be configured to perform the same evaluation with respect to intensity of the sentiment detected in the physiological data. Therefore, the sentiment engine module determines whether the prediction for emotional intensity meets a threshold in Operation 1120. If so, then the sentiment engine module sets the intensity of the sentiment in Operation 1125. At this point, the process flow 1100 ends.

Personification Engine Module

Figure 12:
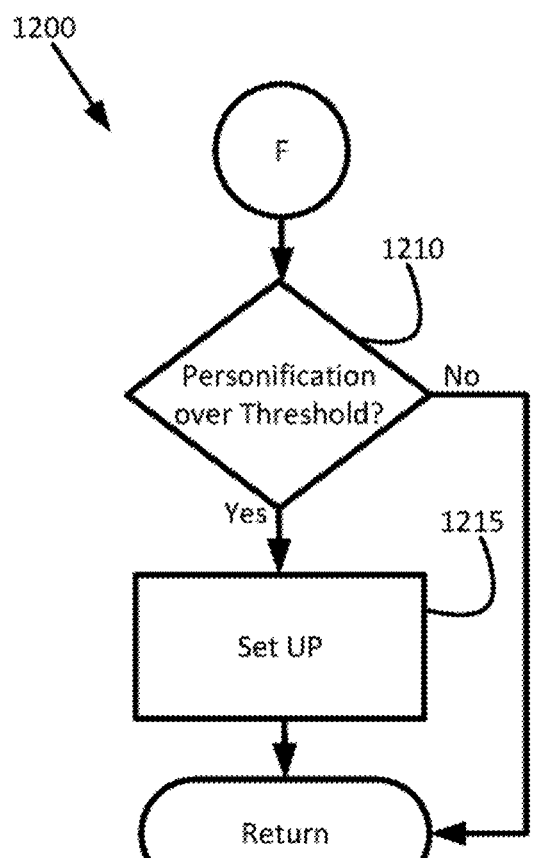
FIG. 12 is a process flow for identifying a personification response in accordance with various embodiments of the present invention.

Turning now to FIG. 12, additional details are provided regarding identifying one or more personifications being displayed by an end-user based on collected physiological data according to various embodiments. FIG. 12 is a flow diagram showing a personification engine module for performing such functionality according to various embodiments of the invention. As previously mentioned, the personification engine module may be invoked by another module in particular embodiments to identify one or more personifications such as, for example, the response module previously described. However, with that said, the personification engine module may not necessarily be invoked by another module and may execute as a stand-alone module in other embodiments.

The process flow 1200 begins with the personification engine module determining whether the predictions provided by the machine learning models for the different personifications meet a threshold in Operation 1210. As previously mentioned, each of the predictions may be provided as a percentage representing a confidence the end-user is exhibiting the corresponding personification. If a personification prediction is found to meet the threshold, then the personification engine module sets the personification as being detected in the physiological data in Operation 1215. At this point, the process flow 1200 ends.

Overview of a Conversation According to Various Embodiments

Figure 13:
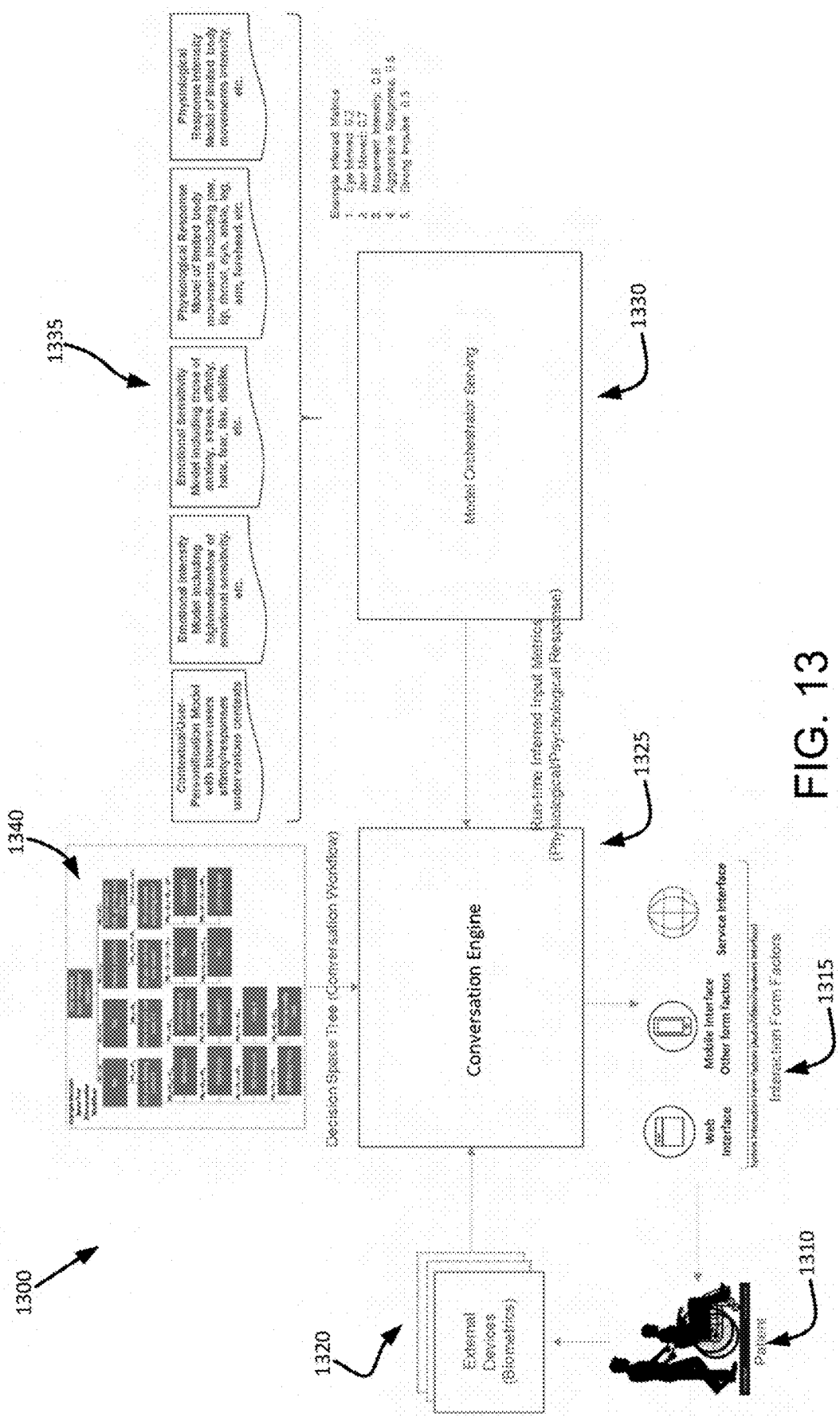
FIG. 13 is an overview of a conversation using an interface in accordance with various embodiments of the present invention.

FIG. 13 provides an overview 1300 of a conversation being conducted with an end-user 1310 interacting with a query assistant user interface 1315 according to various embodiments. Accordingly, the end-user 1310 is being monitored using different external devices 1320 configured for detecting different physiological data such as an EEG sensor for capturing brainwaves and one or more motion sensors for capturing different movements of body parts. In addition, equipment may be used to capturing imaging, video, and/or sound produced by the end-user.

Here, the end-user 1310 is presented with a query through the interface 1315 and is provided with one or more response options to the query. Each one of the response options may identify one or more actions to be performed by the end-user 1310 to select the corresponding option. Therefore, the end-user 1310 performs the action(s) and the external devices 1320 capture physiological data during this time that is submitted to the conversation engine 1325. In turn, the conversation engine 1325 provides the physiological data to the model orchestrator 1330 and the orchestrator uses the data as input to the machine learning models to produce predictions for various actions and reactions 1335 the end-user 1310 may be performing/experiencing while responding to the current query.

In addition, although not shown in FIG. 13, a contextual and user-personification engine may provide information on known habits and idiosyncrasies of the end-user 1310 that may be used in selecting which machine learning models to use to generate predictions and/or adjusting the predictions provided by the machine learning models. For example, the contextual and user-personification engine may indicate the end-user 1310 has a tendency of moving his or her head often. Therefore, the machine learning model configured for predicting this particular personification may be selected based on this tendency and/or a prediction that the end-user 1310 has tilted his or her head may be discounted due to this tendency. While in another example, the contextual and user-personification engine may indicate the end-user 1310 is known to be reserved at showing emotion. Therefore, a prediction of high intensity emotion may be enhanced to emphasize this psychological reaction.

One or more of actions and/or reactions 1335 are identified as being performed and/or experienced by the end-user 1310 based on the predictions provided by the machine learning models and the conversation engine 1325 uses the identified actions and/or reactions to determine which of the response options the end-user 1310 has selected. Here, the conversation engine 1325 may have one or more operations performed as a result of the identified response option. For example, the conversation engine 1325 may display the identified response on the interface 1315 to the end-user and/or may have one or more commands performed to control a device or equipment.

At this point, the conversation engine 1325 determines whether another query is a dependent node of the identified response option from the conversation decision tree 1340. If so, then the conversation engine 1325 has the new query displayed on the interface 1315 to the end-user 1310. Accordingly, the conversation decision tree 1340 is used to direct the interaction of the end-user 1310 through the query assistant user interface 1315.

Figure 14:
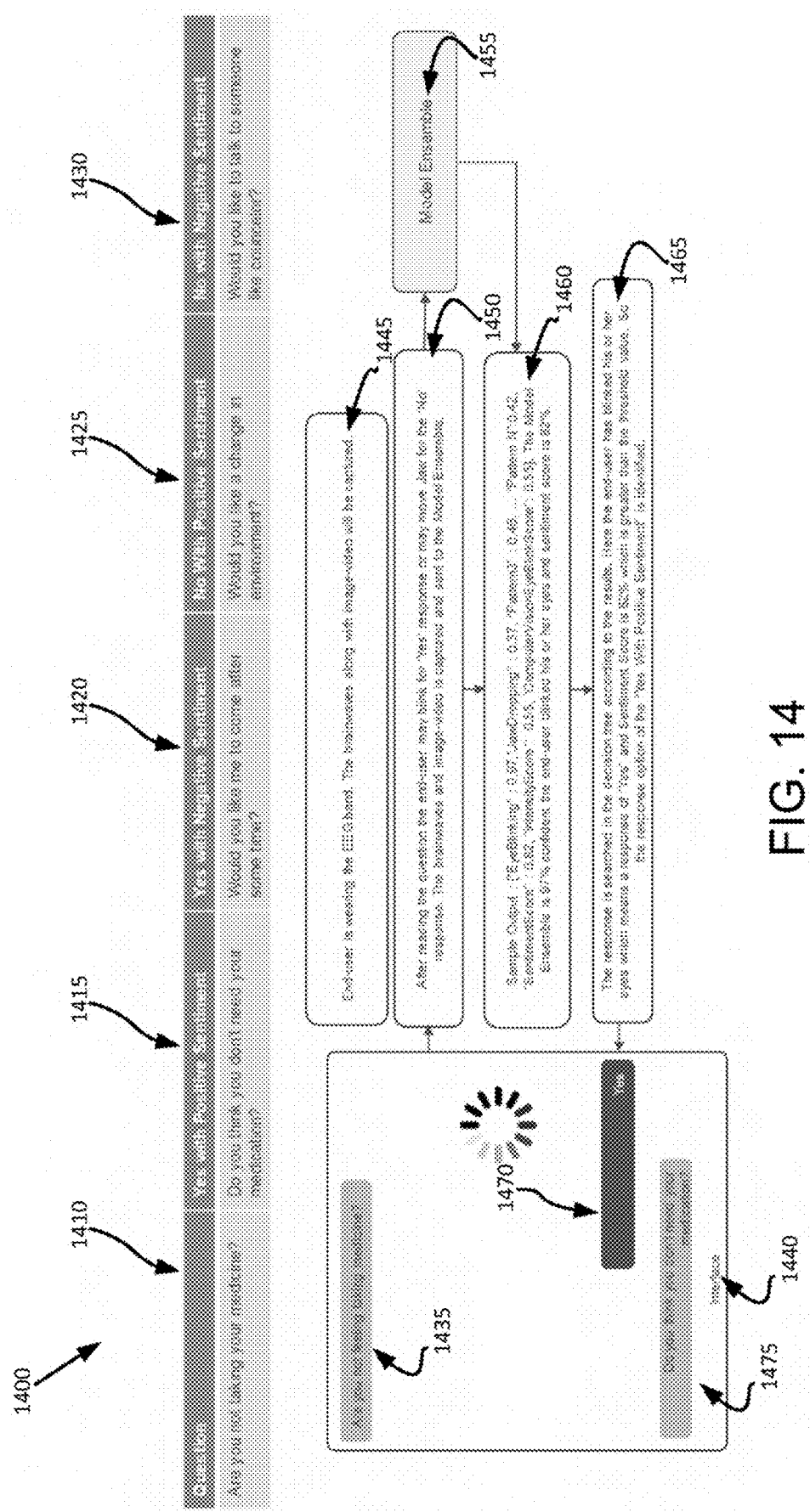
FIG. 14 is an example of a query produced in accordance with various embodiments of the present invention.

FIG. 14 provides an example of a query exchange 1400 during a conversation with an end-user who is interacting with an interface 1440. The decision tree mapping involves an initial question asking the end-user "Are you not taking your medicine?" 1410 along with four dependent queries that serve as follow-up questions based on the end-user's response to the initial query: "Do you think you don't need your medicine?" 1415; "Would you like me to come after some time?" 1420; "Would you like a change in environment?" 1425; and "Would you like to talk to someone like counselor?" 1430. Each of the follow-up questions 1415, 1420, 1425, 1430 is associated with a particular response option that involves an action and a reaction. In this case the first follow-up question 1415 is associated with the response option of yes with positive sentiment, the second follow-up question 1420 is associated with the response option of yes with negative sentiment, the third follow-up question 1425 is associated with the response option of no with positive sentiment, and the fourth question 1430 is associated with the response option of no with negative sentiment. Accordingly, the initial question 1435 is displayed on the interface 1440.

Here, the end-user is wearing an EEG headband so that his or her brainwaves can be captured, and video/imaging is being performed to capture movements 1445. After reading the question the end-user may blink for "Yes" response or move Jaw for the "No" response 1450. Monitored physiological data is captured as the end-user responds and is sent as input to the model ensemble (e.g., collection of machine learning models) 1455 to provide predictions on the end-user's actions and/or reactions. In this instance, the predictions indicate the model ensemble is ninety-seven percent confident the end-user blinked, and the sentiment score is eighty-two percent 1460. Here, a sentiment score greater than seventy percent is considered the end-user is experiencing positive sentiment.

The response is searched in the decision tree according to the results of the predictions produced by the model ensemble on the brainwaves and the image-video data. Thus, the end-user has blinked his or her eyes which means the response is "Yes" and the sentiment score is eighty-two percent which is greater than the threshold value so the response option of "Yes with Positive Sentiment" is identified 1465. As a result, the response "Yes" 1470 is displayed on the interface 1440. In addition, the first follow-up question 1475 is displayed on the interface 1440 since this particular question is associated with the predicted response option.

Figure 15:
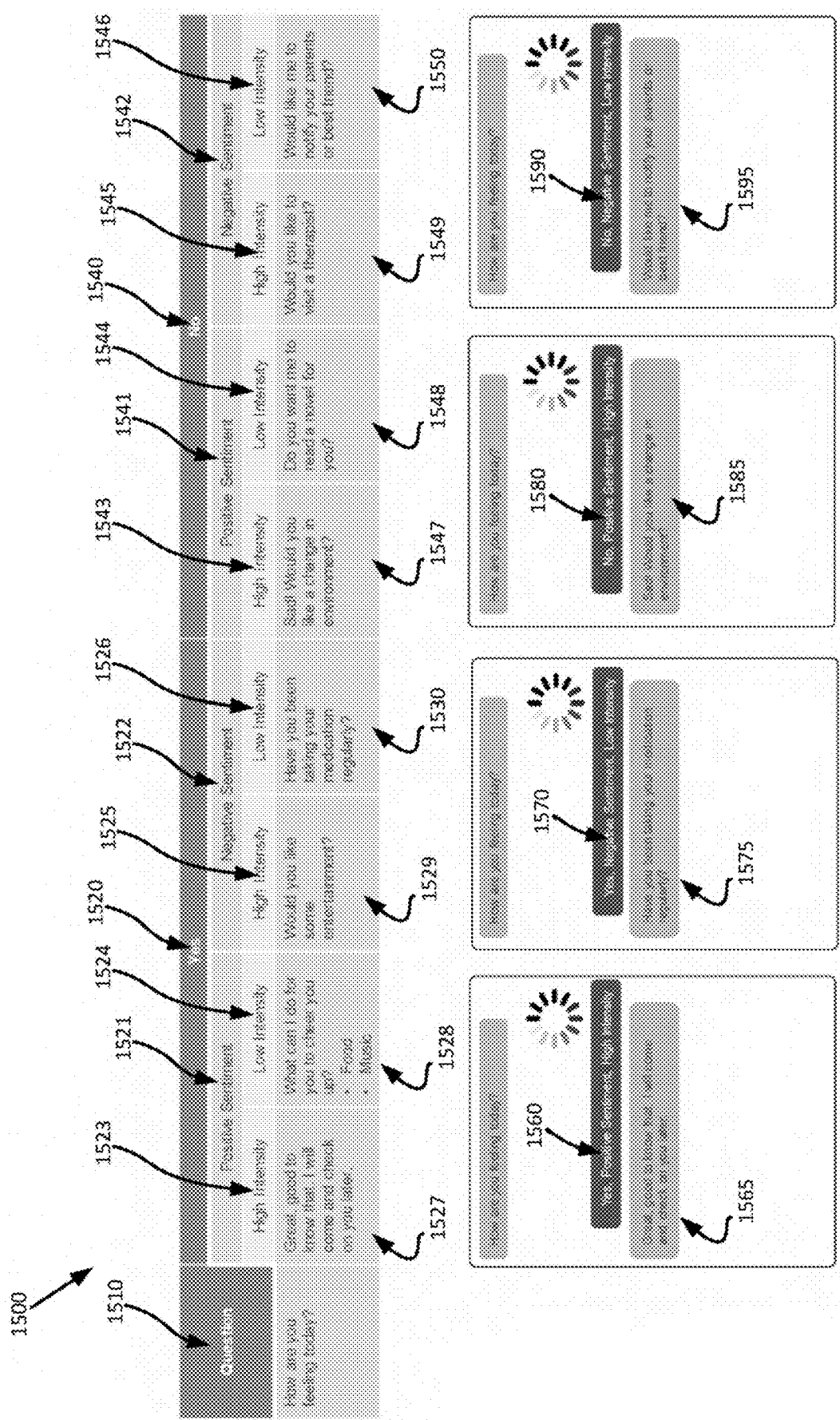
FIG. 15 is a second example of a query produced in accordance with various embodiments of the present invention.

Turning now to FIG. 15, this figure provides a second example of a query exchange 1500 during a conversation with an end-user who is interacting with an interface. In this example, the decision tree mapping involves an initial question asking the end-user "Are you taking your medication?" 1510. Eight combination of actions and reactions make up the response options that are monitored with respect to the initial question 1510. Here, the end-user may blink to indicate "Yes" and move his or her jaw to indicate "No."

The decision tree mapping is laid out with the first portion 1520, 1540 of the response options being the action of the end-user responding "Yes" or "No" to the question 1510. The second portion 1521, 1522, 1541, 1542 of the response options is whether the end-user is experiencing positive sentiment or negative sentiment at the time he or she responds to the question 1510. The third portion 1523, 1524, 1525, 1526, 1543, 1544, 1545, 1546 of the response options is the intensity at which the end-user responds to the question 1510. Each of the response options (e.g., each combination of response 1520, 1540, sentiment 1521, 1522, 1541, 1542, and intensity 1523, 1524, 1525, 1526, 1543, 1544, 1545, 1546) has a dependent query 1527, 1528, 1529, 1530, 1547, 1548, 1549, 1550 in the mapping that is displayed on the interface as a result of detecting the particular response option to the initial question 1510.

Therefore, if the response option to the initial question 1510 is determined to be "yes" with positive sentiment and high intensity 1560, then the follow-up query "Great, good to know that, I will come and check on you later." 1565 is displayed on the interface. Similarly, if the response option is determined to be "yes" with negative sentiment and low intensity 1570, then the follow-up query "Have you been taking your medication regularly?" 1575 is displayed on the interface. Further, if the response option is determined to be "no" with positive sentiment and high intensity 1580, then the follow-up query "Sad! Would you like a change in environment?" 1585 is displayed on the interface. Finally, if the response option is determined to be "no" with negative sentiment and low intensity 1590, then the follow-up query "Would you like me to notify your parents are best friend?" 1595 is displayed on the interface.

Accordingly, the mapping of the conversation decision tree in various embodiments drives the interaction between the end-user and the interface. Here, the mapping provides a layout as to how the interface is to respond to the end-user selecting response options to various queries by providing further queries. The end-user's selection of a response option is directed by monitoring both actions performed by the end-user such as blinking eyes, moving jaw, tilting head, etc. and reactions experienced by the end-user such as emotional sensitivity (e.g., sentiment). Further, an intensity with respect to these actions and/or reactions can be incorporated into the response options to provide further fine-tuning.

As those of ordinary skill in the art will recognized from these examples, similar mapping of conversation decision trees can be used in various embodiments to map queries and response options for many interface applications. For example, such mappings can be used to generate command buttons displayed on an interface for a device or equipment that can be used to control the device or equipment. Therefore, one or ordinary skill in the art should not view the examples provided in FIGS. 14 and 15 as limiting the scope of the invention.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for enabling guided interaction with a query assistant software using brainwave data, the computer-implemented method comprising:
  providing, by one or more processors, a query assistant user interface to a client device for presentation to a monitored end-user, wherein the query assistant user interface displays a query associated with a plurality of response options;
  subsequent to providing the query assistant user interface, receiving, by the one or more processors, one or more user monitoring data objects associated with the monitored end-user, wherein the one or more user monitoring data objects comprise (i) one or more user brainwave monitoring data objects, and (ii) one or more physical action data objects captured by one or more sensors;
  generating, using the one or more user monitoring data objects and a plurality of response designation machine learning models, a plurality of predicted response designators, wherein: (i) each of the plurality of response designators comprises a physiological response designator for a corresponding one of the response designation machine learning models, and (ii) each physiological response designator indicates the predicted likelihood that an intended physiological action was performed by the monitored end-user, wherein the predicted likelihood is generated by the corresponding one of the response designation machine learning models;
  determining a user response based at least in part on the plurality of response designators by:
    (i) identifying one or more dependent nodes of a current node of a conversation decision tree data object, wherein each dependent node of the one or more dependent nodes is associated with a related set of candidate response designator values,
    (ii) identifying a selected dependent node of the one or more dependent nodes whose related set of candidate response designator values has a highest degree of overlap relative to the plurality of response designators, and
    (iii) determining the user response based at least in part on the selected dependent node; and
  providing a subsequent query to the query assistant user interface, wherein (a) the subsequent query is based at least in part on the determined user response, and (b) is presented via the client device to the monitored end-user.

2. The computer-implemented method of claim 1, wherein the plurality of intended physiological actions comprises an intended jaw movement action and an intended eye blinking action.

3. The computer-implemented method of claim 1, wherein the one or more user monitoring data objects further comprise at least one of a user device monitoring data object, a visual monitoring data object, an audio monitoring data object, or a user personification data object.

4. The computer-implemented method of claim 1, wherein the plurality of response designators further comprises at least one of an emotional intensity designator, an emotional sensitivity designator, a physiological response intensity designator, or a user personification designator.

5. The computer-implemented method of claim 1, wherein causing the client device to update the query assistant user interface based at least in part on the user response comprises:
  determining whether the selected dependent node is associated with an updated query having a plurality of updated response options; and
  in response to determining that the selected dependent node is associated with the updated query, causing the client device to update the query assistant user interface to describe the updated query.

6. The computer-implemented method of claim 1, wherein the plurality of response designation machine learning models comprises a sentiment detection machine learning model.

7. The computer-implemented method of claim 6, wherein:
  the sentiment detection machine learning model is a supervised machine learning model trained using ground-truth sentiment designation labels; and
  the ground-truth sentiment designation labels are generated based at least in part on sentiment reporting data for the monitored end-user over a sentiment monitoring window.

8. The computer-implemented method of claim 1, wherein the plurality of response designation machine learning models comprises an intensity detection machine learning model.

9. The computer-implemented method of claim 8, wherein:
  the intensity detection machine learning model is a supervised machine learning model trained using ground-truth intensity designation labels; and
  the ground-truth intensity designation labels are generated based at least in part on intensity reporting data for the monitored end-user over an intensity monitoring window.

10. An apparatus for enabling guided interaction with a query assistant software using brainwave data, the apparatus comprising at least one processor and at least one memory including a computer program code, the at least one memory and the computer program code configured to, with the at least one processor, cause the apparatus to:
  provide a query assistant user interface to a client device for presentation to a monitored end-user, wherein the query assistant user interface displays a query associated with a plurality of response options;
  subsequent to providing the query assistant user interface, receive one or more user monitoring data objects associated with the monitored end-user, wherein the one or more user monitoring data objects comprise (i) one or more user brainwave monitoring data objects, and (ii) one or more physical action data objects captured by one or more sensors;

generate, using the one or more user monitoring data objects and a plurality of response designation machine learning models, a plurality of predicted response designators, wherein: (i) each of the plurality of response designators comprises a physiological response designator for a corresponding one of the response designation machine learning models, and (ii) each physiological response designator indicates the predicted likelihood that an intended physiological action was performed by the monitored end-user, wherein the predicted likelihood is generated by the corresponding one of the response designation machine learning models;

determine a user response based at least in part on the plurality of response designators by:
(i) identifying one or more dependent nodes of a current node of a conversation decision tree data object, wherein each dependent node of the one or more dependent nodes is associated with a related set of candidate response designator values,
(ii) identifying a selected dependent node of the one or more dependent nodes whose related set of candidate response designator values has a highest degree of overlap relative to the plurality of response designators, and
(iii) determining the user response based at least in part on the selected dependent node; and provide a subsequent query to the query assistant user interface, wherein (a) the subsequent query is based at least in part on the determined user response, and (b) is presented via the client device to the monitored end-user.

11. The apparatus of claim 10, wherein the one or more user monitoring data objects further comprise at least one of a user device monitoring data object, a visual monitoring data object, an audio monitoring data object, or a user personification data object.

12. The apparatus of claim 10, wherein the plurality of response designators further comprises at least one of an emotional intensity designator, an emotional sensitivity designator, a physiological response intensity designator, or a user personification designator.

13. The apparatus of claim 10, wherein the at least one memory and the computer program code are configured to, with the at least one processor, cause the apparatus to cause the client device to update the query assistant user interface based at least in part on the user response by:
determining whether the selected dependent node is associated with an updated query having a plurality of updated response options; and
in response to determining that the selected dependent node is associated with the updated query, causing the client device to update the query assistant user interface to describe the updated query.

14. An non-transitory computer storage medium comprising instructions for enabling guided interaction with a query assistant software using brainwave data, the instructions being configured to cause one or more processors to at least perform operations configured to:
provide a query assistant user interface to a client device for presentation to a monitored end-user, wherein the query assistant user interface displays a query associated with a plurality of response options;

subsequent to providing the query assistant user interface, receive one or more user monitoring data objects associated with the monitored end-user, wherein the one or more user monitoring data objects comprise (i) one or more user brainwave monitoring data objects, and (ii) one or more physical action data objects captured by one or more sensors;

generate, using the one or more user monitoring data objects and a plurality of response designation machine learning models, a plurality of predicted response designators, wherein: (i) each of the plurality of response designators comprises a physiological response designator for a corresponding one of the response designation machine learning models, and (ii) each physiological response designator indicates the predicted likelihood that an intended physiological action was performed by the monitored end-user, wherein the predicted likelihood is generated by the corresponding one of the response designation machine learning models;

determine a user response based at least in part on the plurality of response designators by:
(i) identifying one or more dependent nodes of a current node of a conversation decision tree data object, wherein each dependent node of the one or more dependent nodes is associated with a related set of candidate response designator values,
(ii) identifying a selected dependent node of the one or more dependent nodes whose related set of candidate response designator values has a highest degree of overlap relative to the plurality of response designators, and
(iii) determining the user response based at least in part on the selected dependent node; and provide a subsequent query to the query assistant user interface, wherein (a) the subsequent query is based at least in part on the determined user response, and (b) is presented via the client device to the monitored end-user.

15. The non-transitory computer storage medium of claim 14, wherein the one or more user monitoring data objects further comprise at least one of a user device monitoring data object, a visual monitoring data object, an audio monitoring data object, or a user personification data object.

16. The non-transitory computer storage medium of claim 14, wherein the plurality of response designators further comprises at least one of an emotional intensity designator, an emotional sensitivity designator, a physiological response intensity designator, or a user personification designator.

17. The non-transitory computer storage medium of claim 14, wherein the instructions are configured to cause the one or more processors to at least perform operations configured to cause the client device to update the query assistant user interface based at least in part on the user response by:
determining whether the selected dependent node is associated with an updated query having a plurality of updated response options; and
in response to determining that the selected dependent node is associated with the updated query, causing the client device to update the query assistant user interface to describe the updated query.

* * * * *

UNITED STATES PATENT AND TRADEMARK OFFICE
CERTIFICATE OF CORRECTION

| | |
|---|---|
| PATENT NO. | : 11,567,574 B2 |
| APPLICATION NO. | : 17/028179 |
| DATED | : January 31, 2023 |
| INVENTOR(S) | : Amit Krishna et al. |

It is certified that error appears in the above-identified patent and that said Letters Patent is hereby corrected as shown below:

In the Claims

In Column 35, Claim 14, Line 58, delete "An non-transitory" and insert -- A non-transitory --, therefor.

Signed and Sealed this
Eighteenth Day of April, 2023

Katherine Kelly Vidal
*Director of the United States Patent and Trademark Office*